(12) United States Patent
Thomsen et al.

(10) Patent No.: US 12,045,035 B2
(45) Date of Patent: Jul. 23, 2024

(54) EDGE DEVICE FEATURE ENGINEERING APPLICATION

(71) Applicant: Rockwell Automation Technologies, Inc., Mayfield Heights, OH (US)

(72) Inventors: Achim Thomsen, Krefeld (DE); Cyril Perducat, Arlington, MA (US); Manuel Sukerman, Chicago, IL (US); Arvind Vijayanagar Rao, Mequon, WI (US); Chirayu Shah, Menomonee Falls, WI (US); Stephen C. Briant, Moon Township, PA (US); Bijan SayyarRodsari, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/299,142

(22) Filed: Apr. 12, 2023

(65) Prior Publication Data

US 2023/0280723 A1    Sep. 7, 2023

Related U.S. Application Data

(63) Continuation of application No. 17/687,775, filed on Mar. 7, 2022, now Pat. No. 11,656,603.

(51) Int. Cl.
*G05B 19/4155*    (2006.01)
(52) U.S. Cl.
CPC ............. *G05B 19/4155* (2013.01); *G05B 2219/31449* (2013.01)
(58) Field of Classification Search
None
See application file for complete search history.

(56) References Cited

U.S. PATENT DOCUMENTS 10,572,541 B2    2/2020    Fletcher et al.
2012/0266094 A1    10/2012    Starr et al.
(Continued)

OTHER PUBLICATIONS

Telit deviceWise Edge: An integration and enablement plattorm for managing your industrial IoT(IIoT) solutions without custom code. Telit. web accessed on Jul. 7, 2022: https://www.telit.com/iot-plafforms-overview/telit-devicewise-edge/ (9 pages).
(Continued)

*Primary Examiner* — Ryan A Jarrett
(74) *Attorney, Agent, or Firm* — Amin, Turocy & Watson, LLP

(57) ABSTRACT

An industrial gateway device supports interactive feature engineering tools that guide a user through an intuitive process for configuring data analytics for key performance indicators (KPIs) of interest. A feature engineering interface renders an interactive model view that displays available data points such that the data points are organized hierarchically according to plant, machine, machine property, or other elements. The user can select, from this model view, data points having an impact on the KPI of interest. The interface also allows the user to define an executable script that defines a mathematical relationship between the selected data points and the KPI. This configuration yields an output model that defines a reduced set of data points to be collected and analyzed, as well as an executable script for assessing a state of the KPI as a function of the reduced data point values.

20 Claims, 23 Drawing Sheets

(56) References Cited

U.S. PATENT DOCUMENTS

2018/0300437 A1\* 10/2018 Thomsen .......... G06F 16/24573
2020/0265329 A1\* 8/2020 Thomsen ............. G05B 13/044
2021/0208571 A1\* 7/2021 Thomsen ................ G06F 16/25
2022/0308533 A1 9/2022 Robert et al.

OTHER PUBLICATIONS

Notice of Allowance received for U.S. Appl. No. 17/687,775 dated Jan. 13, 2023, 22 pages.
Extended European Search Report received for European Patent Application Serial No. 23157069.8 dated Aug. 24, 2023, 10 pages.

\* cited by examiner

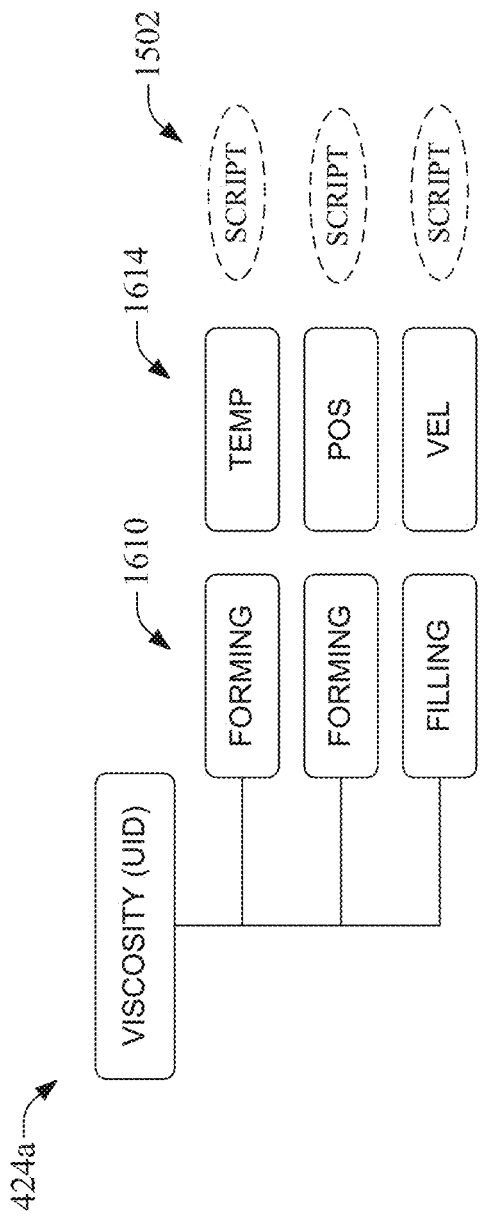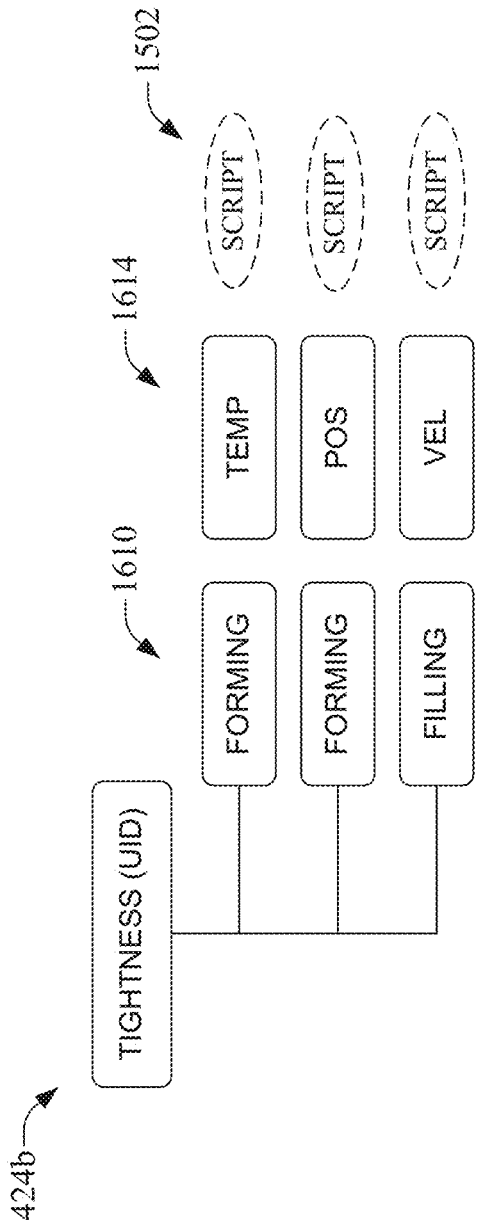

EDGE DEVICE FEATURE ENGINEERING APPLICATION

CROSS-REFERENCE TO RELATED APPLICATIONS

This application is a continuation of, and claims priority to, U.S. patent application Ser. No. 17/687,775, filed on Mar. 7, 2022, and entitled "EDGE DEVICE FEATURE ENGINEERING APPLICATION," the entirety of which is incorporated herein by reference.

BACKGROUND

The subject matter disclosed herein relates generally to industrial automation systems, and, for example, to feature engineering for industrial data.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a memory that stores executable components, wherein the memory further stores an asset model that models an industrial process in terms of hierarchical elements, and the asset model references data tags defined on one or more industrial devices that implement the industrial process; a user interface component configured to render, on a client device via an interface display, an interactive model view of the asset model, receive, via interaction with the interactive model view, selection of a subset of the data tags, and receive, via interaction with the interface display, scripting input that defines an executable script, the executable script defining a mathematical relationship between the subset of the data tags and a state of a performance indicator of the industrial process; and a model generation component configured to generate, based on the selection and the scripting input, an output model that defines the subset of the data tags and the executable script, wherein the output model configures the system to retrieve, from the one or more industrial devices, industrial data associated with the subset of the data tags and to execute the executable script on the industrial data for respective units processed by the industrial process.

Also, one or more embodiments provide a method, comprising registering, on a system comprising a processor, an asset model that models an industrial process in terms of hierarchical elements, wherein the asset model references data tags defined on one or more industrial devices that perform the industrial process; rendering, by the system on a client device, an interface display that renders an interactive model view of the asset model; receiving, by the system via interaction with the interactive model view, selection of a subset of the data tags; receiving, by the system via interaction with the interface display, scripting input that defines an executable script, wherein the executable script defines a mathematical relationship between the subset of the data tags and a state of a performance indicator of the industrial process; generating, by the system based on the selection and the scripting input, an output model that defines the subset of the data tags and the executable script; and for respective units generated by the industrial process: retrieving, by the system from the one or more industrial devices based on the output model, industrial data associated with the subset of the data tags; and executing the executable script on the industrial data.

Also, according to one or more embodiments, a non-transitory computer-readable medium is provided having stored thereon instructions that, in response to execution, cause a system to perform operations, the operations comprising storing, on a gateway device, an asset model that models an industrial process in terms of hierarchical elements, wherein the asset model references data tags defined on one or more industrial devices that perform the industrial process; rendering, on a client device, an interface display that renders an interactive model view of the asset model; receiving, via interaction with the interactive model view, selection of a subset of the data tags; receiving, via interaction with the interface display, scripting input that defines an executable script, wherein the executable script defines a mathematical relationship between the subset of the data tags and a state of a performance indicator of the industrial process; and generating, based on the selection and the scripting input, an output model that defines the subset of the data tags and the executable script, wherein the output model configures the gateway device to, for respective units generated by the industrial process: retrieve, from the one or more industrial devices, industrial data associated with the subset of the data tags; and execute the executable script on the industrial data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIGS. 17a and 17b are representations of example output models for respective two KPIs generated based on a user's selection of relevant properties from the interactive model view.

DETAILED DESCRIPTION

Figure 1:
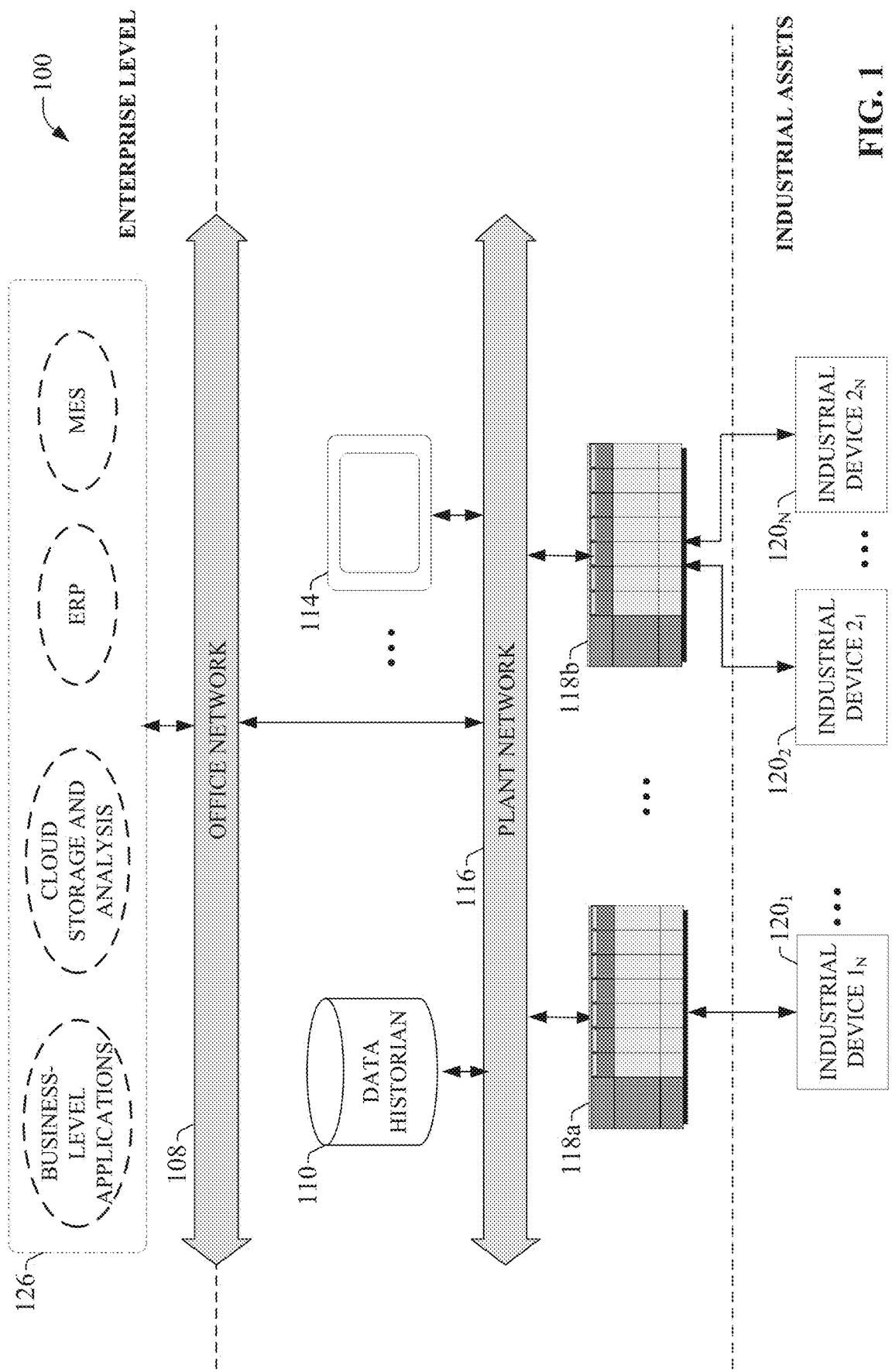
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Figure 2:
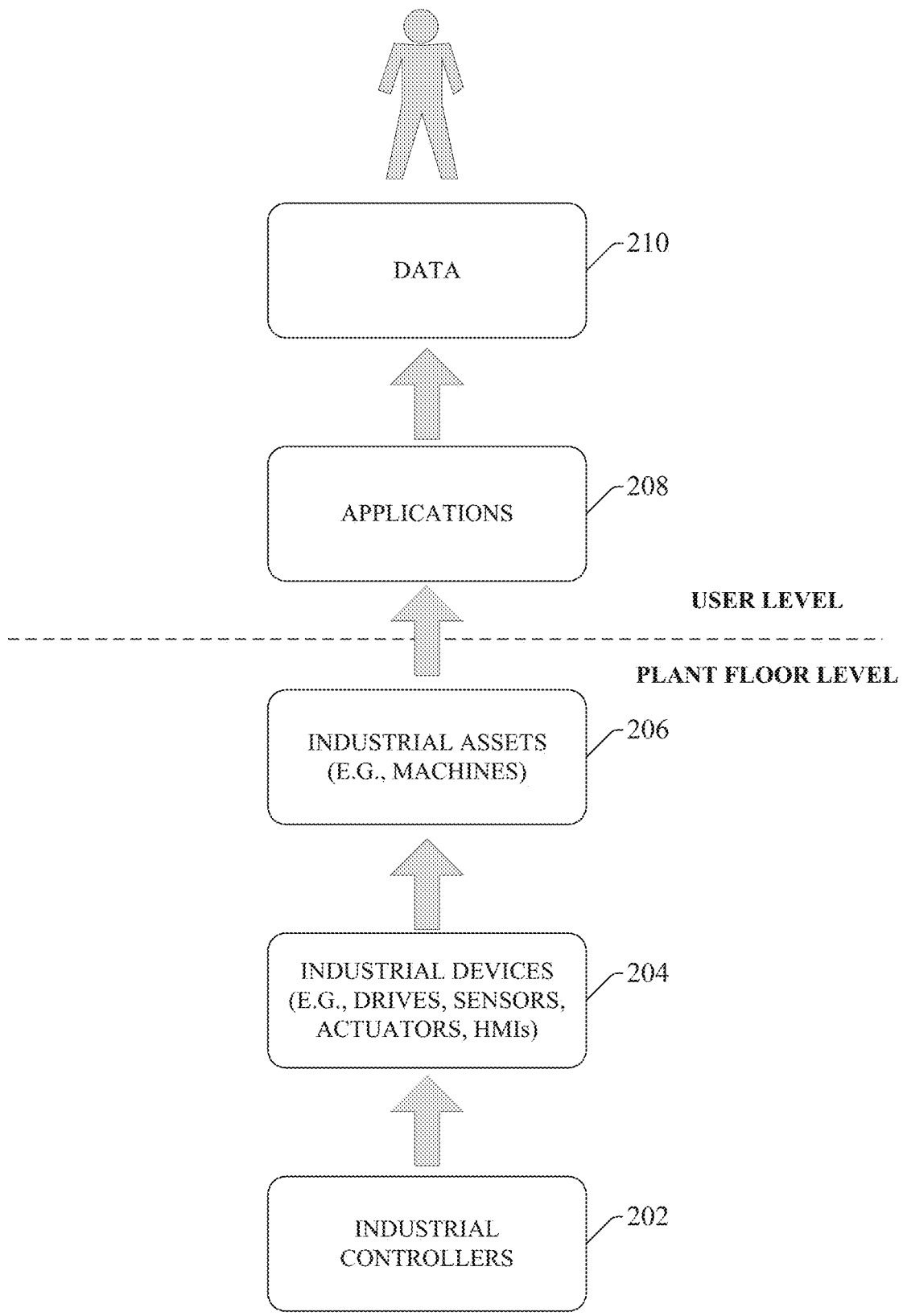
FIG. 2 is a conceptual diagram illustrating the flow of industrial data across various information levels in a typical industrial environment.

Industrial assets and their associated industrial assets can generate large amounts of information during operation. FIG. 2 is a conceptual diagram illustrating the flow of industrial data across various information levels in a typical industrial environment. On the plant floor level, industrial assets 206—e.g., industrial machines, production lines, industrial robots, etc.—carry out respective tasks in connection with manufacture, packaging, or handling of a product; control of an industrial process; or other such industrial functions. These industrial assets 206 are directly monitored and controlled by industrial devices 204. For example, various statuses and metrics of the industrial assets 206 (e.g., actuator positions, motor speeds, temperatures, flows, pressures, human presence, etc.) can be monitored using proximity switches, telemetry devices, photo-sensors, or other such monitoring devices. Industrial devices that facilitate control of the industrial assets 206 can include, for example, motor drives, pneumatic actuators, remote I/O devices, or other such equipment. Industrial devices 204 can also include HMIs (e.g., HMIs 114).

Industrial controllers 202 perform supervisory monitoring and control of the industrial assets 206 via industrial devices 204. In this regard, industrial devices 204 serve as inputs and outputs for industrial controllers 202, which control their output industrial devices in accordance with user-defined control routines (e.g., ladder logic programs, sequential function chart programs, etc.) and the current values and statuses of the input industrial devices. Data generated by industrial devise 204 reflect the current statuses of the industrial assets 206. This data is read by industrial controllers 202, which can generate additional data (e.g., calculated supplemental data, aggregated values, etc.) based on these industrial device statues and values.

At the user level, customized applications—e.g., reporting applications, visualization applications, enterprise resource planning applications, manufacturing execution systems, etc.—can collect selected subsets of information available in industrial controllers 202 and present this information as formatted data 210 to a user in accordance with data presentation formats defined in the applications 208.

Collecting and delivering some or all of this information to a user in meaningful presentation formats can offer valuable insights into past, current, and future operation of the industrial assets 202. However, the highly distributed nature of data available across many industrial devices associated with various industrial machines or systems that make up an industrial enterprise presents a challenge with regard to collection and formatting of the data for a common presentation that can be delivered to a user's client device. Moreover, much of the information available on a given set of industrial devices comprises uncontextualized, unstructured data (e.g., integer, real, or discrete values stored on the data table of an industrial controller) whose meaning must be defined by the applications 208 used to present the data. This places a burden on the developers of such applications 208, who must designate the meaning of each item of unstructured data received and rendered by these applications so that the data will have meaning to the viewer (e.g., a product count, a production rate, a system temperature or pressure, a historical trend, etc.).

To address these and other issues, one or more embodiments of the present disclosure provide an industrial data presentation system that support the use of structured data types in connection with generating and delivering meaningful presentations of industrial data. In one or more embodiments, industrial devices and/or controllers are configured to support structured data types—referred to herein as basic information data types (BIDTs)—comprising a finite set of structured information data types. In an example implementation, the basic information data types can comprise structured information data types representing, for example a rate, states, an odometer, and events. Within an industrial device or controller configuration, a user can define associations between respective physical assets (e.g., a machine, a production line, etc.) and one or more of the basic information data types. This can include, for example, defining one or more data tags representing a metric or status of the physical asset and associating each tag with one of the basic information data types. Each basic information data type has associated metadata that can be configured by a user to customize the data tag for a given industrial application (e.g., maximum and minimum values for rate data types, roll-over values for odometer data types, event or state names for event and state data types, any parent-child relationships between data tags, etc.).

Once configured in an industrial device or controller, the BIDTs are discoverable by external data collection and/or visualization systems, including local systems sharing a network with the industrial device or remote cloud-based systems. For example, a gateway device can be configured with one or more asset models that reference BIDT data tags on the industrial devices. The asset models assign groups of BIDT data tags to respective hierarchical elements of the asset models (e.g., a production facility, a production area or line, and industrial asset, a unit of equipment, an industrial device, etc.). The gateway device can retrieve industrial data from the BIDT data tags, as well as the associated user-defined metadata for each tag. Then either the gateway device or a separate application server system can generate a graphical presentation of the industrial data based on a selected one of the asset models and the BIDT metadata.

In some embodiments, the gateway device can also support feature engineering tools that provide an intuitive workflow for defining subsets of available BIDT data points known to have an impact on a KPI of interest, as well as executable scripts defining mathematical relationships between the selected data points and a state of the KPI. These relationships can be recorded as an output model that configures the gateway to collect a reduced set of relevant data points and to assess a health of the KPI based on application of the scripts to the collected data.

Figure 3:
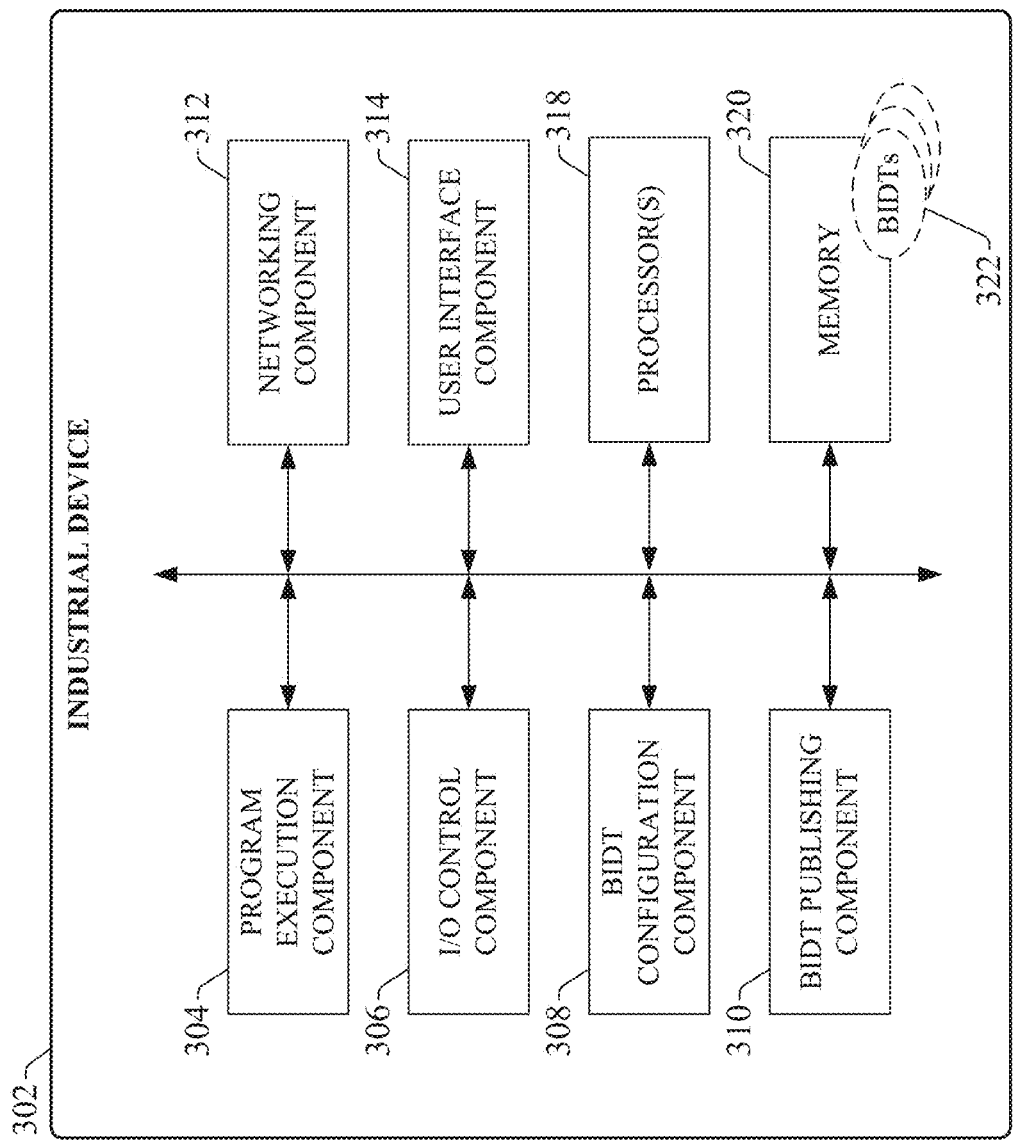
FIG. 3 is a block diagram of an example industrial device that supports basic information data types (BIDTs).

FIG. 3 is a block diagram of an example industrial device 302 that supports basic information data types according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial device 302 can comprise substantially any type of data-generating industrial device, including but not limited to an industrial controller, a motor drive, an HMI terminal, a vision system, an industrial optical scanner, or other such device or system. Industrial device 302 can include a program execution component 304, an I/O control component 306, a BIDT configuration component 308, a BIDT publishing component 310, a networking component 312, a user interface component 314, one or more processors 318, and memory 320. In various embodiments, one or more of the program execution component 304, I/O control component 306, BIDT configuration component 308, BIDT publishing component 310, networking component 312, user interface component 314, the one or more processors 318, and memory 320 can be electrically and/or communicatively coupled to one another to perform one or more of the functions of the industrial device 302. In some embodiments, components 304, 306, 308, 310, 312, and 314 can comprise software instructions stored on memory 320 and executed by processor(s) 318. Industrial device 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Program execution component 304 can be configured to compile and execute a user-defined control program. In various embodiments, the control program can be written in any suitable programming format (e.g., ladder logic, sequential function charts, structured text etc.) and downloaded to the industrial device 302. Typically, the control program uses data values read by the industrial device's analog and digital inputs as input variables, and sets values of the industrial device's analog and digital outputs in accordance with the control program instructions based in part on the input values. I/O control component 306 can be configured to control the electrical output signals of the industrial device's digital and analog electrical outputs in accordance with the control program outputs, and to convert electrical signals on the industrial device's analog and digital inputs to data values that can be processed by the program execution component 304.

BIDT configuration component 308 can be configured to set metadata values associated with BIDT data tags defined for the industrial device 302 based on metadata configuration input data. As will be described in more detail below, in addition to standard general data types (e.g., real, analog, digital, etc.), industrial device 302 is configured to support industrial-specific data types referred to herein as basic information data types (BIDTs). Data tags associated with these basic information data types have associated metadata that can be configured by the user via BIDT configuration component 308 in order to customize the data tags for a given industrial application. For convenience, data tags that are associated with a basic information data type are referred to herein as "BIDTs" or smart objects. BIDTs 322 defined by the user are stored in memory 320 (e.g., in the industrial device's tag database together other defined data tags of other data types).

BIDT publishing component 310 is configured to expose defined BIDTs 322 to external systems, allowing the BIDTs 322 to be discovered by such systems over a local and/or remote network. Networking component 312 can be configured to exchange data with one or more external devices over a wired or wireless network using any suitable network protocol. User interface component 314 can be configured to receive user input and to render output to the user in any suitable format (e.g., visual, audio, tactile, etc.). In some embodiments, user interface component 314 can be configured to communicatively interface with a development application that executes on a client device (e.g., a laptop computer, tablet computer, smart phone, etc.) that is communicatively connected to the industrial device 302 (e.g., via a hardwired or wireless connection). The user interface component 314 can then receive user input data and render output data via the development application. In other embodiments, user interface component 314 can be configured to generate and serve suitable graphical interface screens to a client device, and exchange data via these graphical interface screens. Input data that can be received via user interface component 314 can include, but is not limited to, user-defined control programs or routines, data tag definitions, BIDT metadata configuration data, or other such data.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
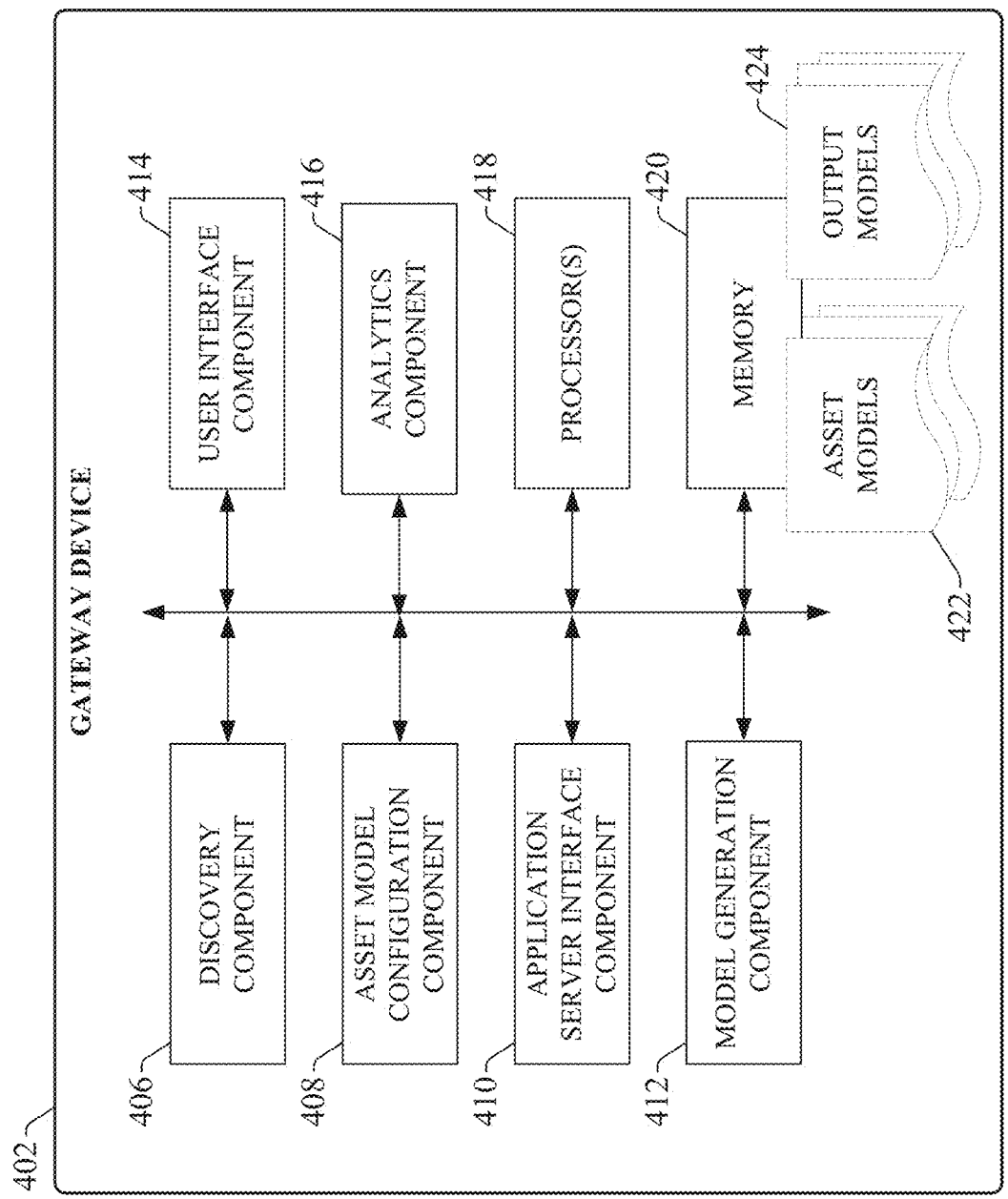
FIG. 4 is a block diagram of a gateway device capable of discovering BIDTs on one or more industrial devices and that supports feature engineering configuration tools.

FIG. 4 is a block diagram of a gateway device 402 capable of discovering BIDTs on one or more industrial devices, formatting a presentation of associated data in accordance with a user-defined asset model, and providing feature engineering tools that allow a user to easily define reduced data models and algorithms to be applied to contextualized data collected from the BIDTs. Gateway device 402 can include a discovery component 406, a model configuration component 408, an application server interface component 410, an a analytics 412, a user interface component 414, a model generation component 416, one or more processors 418, and memory 420. In various embodiments, one or more of the discovery component 406, model configuration component 408, application server interface component 410, analytics component 412, user interface component 414, model generation component 416, the one or more processors 418, and memory 420 can be electrically and/or communicatively coupled to one another to perform one or more of the functions of the gateway device 402. In some embodiments, components 404, 406, 408, 410, 412, 414, and 416 can comprise software instructions stored on memory 420 and executed by processor(s) 418. Gateway device 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Discovery component 406 can be configured to discover BIDTs (e.g., BIDTs 322) defined on industrial devices (e.g., industrial device 302) that are communicatively connected to the gateway device 402. Discovery component 406 can also be configured to retrieve data and metadata associated with the BIDTs for use in generating industrial data presentations or contextualized data models. Asset model configuration component 408 can be configured to create and store one or more asset models 422 in accordance with user-defined asset model definitions. These asset models 422 can represent an industrial asset or collection of industrial assets in terms of hierarchical elements of an industrial facility or collection of facilities, where these hierarchical element can include, but are not limited to, a plant, a production area or line, an industrial machine or other industrial asset, a unit of equipment that makes up an industrial asset, an industrial device (e.g., a controller, a motor drive, a vision system device, a safety device, etc.) associated with an industrial asset, or other such elements. Asset models 422 can also assign groups of BIDTs to respective elements of the hierarchical model. Asset models 422 can be customized to suit the information requirements of various types of information consumers (e.g., line operators, engineers, plant managers, etc.).

Application server interface component 410 can be configured to expose asset models 422 and industrial data collected from industrial devices (e.g., industrial device 302) to an application server (e.g., application server system 502 discussed below), which can aggregate multiple asset models 422 into a larger aggregate plant or enterprise model and generate graphical presentations of the industrial data based on the plant model.

Model generation component 412 can be configured to generate condensed output models 424 for respective process key performance indicators (KPIs) based on user selection of data points of interest from the larger asset models 422. The output models 424 define a subset of available data points collected from the BIDTs of industrial devices relevant to a KPI of interest, and maintain the contextualization and relationships between those data points defined by the asset models 422 and the BIDT metadata. The model generation component 412 can also associate a user-defined algorithm or script with each condensed output model 424. This algorithm is applicable to the data points defined by the output model 424 and defines criteria for assessing the KPI represented by the output model 424 and determining whether an action is required based on the assessment (e.g., rejection of an item of product, notification of a quality issue, etc.).

User interface component 414 can be configured to receive user input and to render output to the user in any suitable format (e.g., visual, audio, tactile, etc.). In some embodiments, user interface component 414 can be configured to communicatively interface with a client application that executes on a client device (e.g., a laptop computer, tablet computer, smart phone, etc.) that is communicatively connected to the gateway device 402 (e.g., via a hardwired or wireless connection). The user interface component 414 can then receive user input data and render output data via the client application. In other embodiments, user interface component 414 can be configured to generate and serve suitable graphical interface screens to a client device, and exchange data via these graphical interface screens. Input data that can be received via user interface component 414 can include, but is not limited to, asset model definitions that are saved as asset models 422, or other such data.

Analytics component 416 can be configured to apply the user-defined algorithms associated with the respective output models 424 to the data subsets defined by the output models 424, and to execute an action, if appropriate, based on a result generated by the algorithm.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
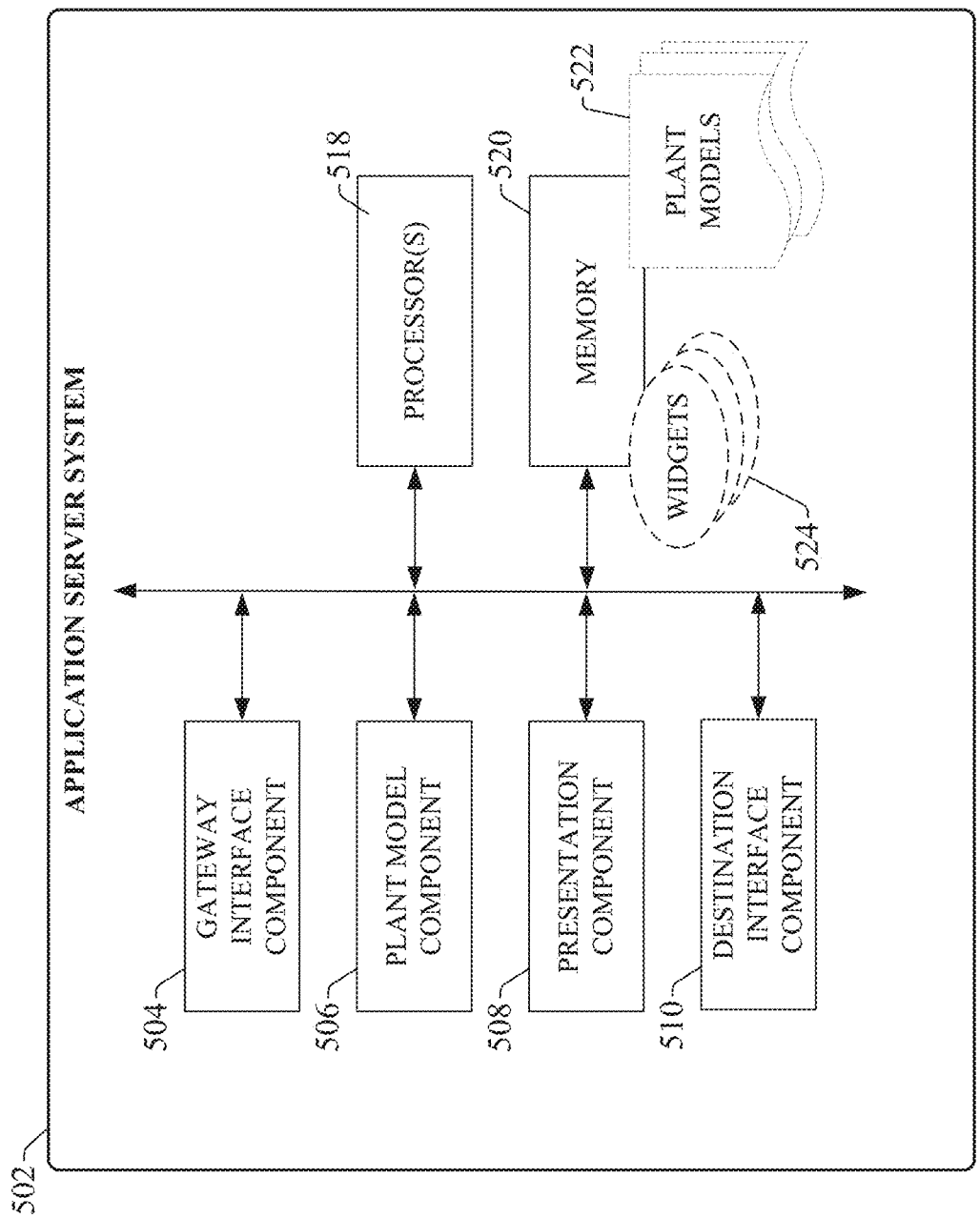
FIG. 5 is a block diagram of an application server system capable of aggregating asset models from gateway devices into one or more plant models and formatting a presentation of associated data received from the gateway devices in accordance with the aggregated plant models.

FIG. 5 is a block diagram of an application server system 502 capable of aggregating asset models 422 from gateway devices (e.g., gateway device 402) into one or more plant models 522 and formatting a presentation of associated data received from the gateway devices 402 in accordance with the aggregated plant models 522. Application server system 502 can include a gateway interface component 504, a plant model component 506, a presentation component 508, a destination interface component 510, one or more processors 518, and memory 520. In various embodiments, one or more of the gateway interface component 504, plant model component 506, presentation component 508, destination interface component 510, the one or more processors 518, and memory 520 can be electrically and/or communicatively coupled to one another to perform one or more of the functions of the application server system 502. In some embodiments, components 504, 506, 508, and 510 can comprise software instructions stored on memory 520 and executed by processor(s) 518. Application server system 502 may also interact with other hardware and/or software components not depicted in FIG. 5. For example, processor(s) 518 may interact with one or more external user interface devices, such as a keyboard, a mouse, a display monitor, a touchscreen, or other such interface devices.

Gateway interface component 504 can be configured to exchange data with one or more gateway devices (e.g., gateway device 402) over a wired or wireless network. In some embodiments, application server system 502 can be an on-premises device that resides on the plant floor, and the gateway interface component 504 can exchange data with the gateway devices 402 over a local plant and/or office network. In other embodiments, application server system 502 can reside on a cloud platform. In such embodiments, the gateway interface component 504 can exchange data with the gateway devices 402 over a combination of a public network (e.g., an Internet layer) and a private network (e.g., a plant or office network at the industrial facility).

The plant model component 506 can be configured to discover asset models 422 maintained on one or more gateway devices 402, and to aggregate these discovered asset models 422 into an overall plant model 522 for an industrial facility or enterprise. The plant model 522 can define hierarchical relationships between industrial assets of a given plant facility, or between assets distributed across geographically diverse plant facilities. The plant model 522 also defines relationships between BIDT data items associated with the respective industrial assets by assigning groups of BIDTs defined in industrial devices associated with the industrial assets to respective hierarchical elements of the plant model 522 (e.g., production lines, industrial asset identifiers, units of equipment, industrial devices, etc.). By defining relationships between assets that make up an industrial facility or enterprise, the plant models 522 similarly define relationships between data items associated with those assets. The hierarchical relationships defined by the plant models 522 can be leveraged by the application server system 502 to present information about the assets to a user in a structured fashion.

Presentation component 508 can be configured to generate a data presentation—e.g., in the form of a graphical display layout, a collection of widgets 524, etc.—that renders selected subsets of data received from the gateway devices 402 in accordance with one or more of the plant models 522. In some embodiments, presentation component 508 can be configured to render data associated with a basic information data type tag using a suitable BIDT-specific widget (or other graphical display element) selected from a set of predefined widgets 524. Destination interface component 510 can be configured to exchange data with one or more destination client devices over a wired or wireless network (e.g., a private plant or office network, a cloud platform, or a public network such as the Internet). This can include delivering the graphical data presentations to a client device in accordance with one or more of the plant models 522.

The one or more processors 518 can perform one or more of the functions described herein with reference to the systems and/or methods disclosed. Memory 520 can be a computer-readable storage medium storing computer-executable instructions and/or information for performing the functions described herein with reference to the systems and/or methods disclosed.

Figure 6:
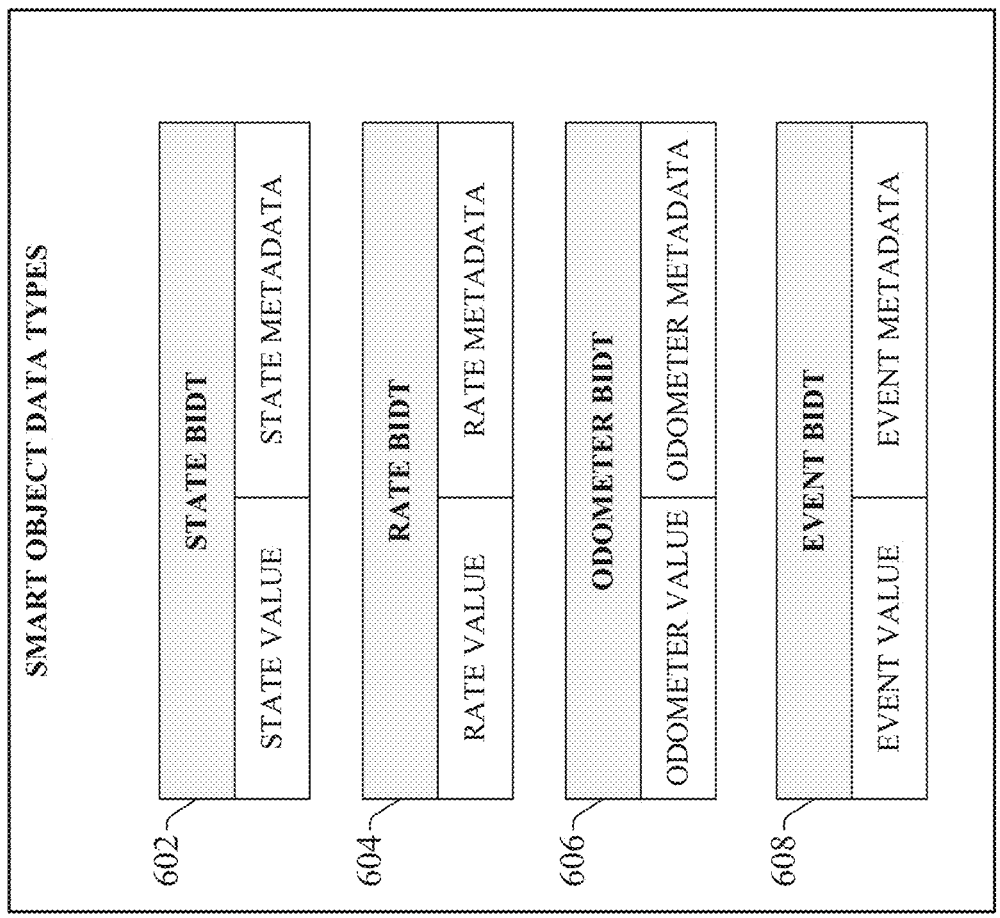
FIG. 6 is an illustration of four example BIDTs that can be supported by one or more embodiments of an industrial device.

FIG. 6 is an illustration of four example basic information data types that can be supported by one or more embodiments of industrial device 302. These data types can supplement other standard data types that are typically supported by industrial controllers or other industrial devices (e.g., integer, real, Boolean, string, floating point etc.). In general, data tags are data structures defined within an industrial device that reference a memory location within the device (e.g., an input value, an output value, or an internal data register) and correspond to respective data items. A data tag can be configured to be (or may be an instance of) of a specified data type, such as Boolean, floating point, integer, double integer, string, etc. During development, controller tags can be created and maintained in a tag database of the industrial device. The BIDTs described herein are additional data types that are catered to industrial automation applications, and that supplement conventional data types.

In the illustrated example, the basic information data types comprise a finite set of four structured information data types—a State BIDT 602, a Rate BIDT 604, an Odometer BIDT 606, and an Event BIDT 608. Although the examples described herein assume that the supported BIDTs comprise these four data types, it is to be appreciated that some embodiments may include other BIDT data types without departing from the scope of this disclosure.

Each BIDT includes a field for storing the current value of the BIDT (e.g., a state value, a rate value, an Odometer value, and an Event value) as well as one or more metadata fields configured to store user-defined configuration data for that BIDT. The metadata values for each BIDT can customize management and presentation of the associated BIDT data value in accordance with the particular industrial asset or industrial application with which the BIDT is associated.

The value contained in a State BIDTs 602 can represent a current state of an industrial asset or device (e.g., a machine, a production line, a motor drive, etc.). The state data contained in a State BIDT 602 can represent one of a set of predefined states representative of a current state or status of the associated industrial asset or device. For example, the State BIDT may convey an S88 state, a Packaging Machine Language state, a current state of a state machine defined for the asset, a state of a valve (e.g., OPEN or CLOSED), a state of a motor (e.g., RUNNING, IDLE, FAULTED, etc.), or other types of states.

User-configurable metadata associated with the State BIDT 602 (which can be configured by BIDT configuration component 308 in accordance with user input received via user interface component 314) may define a state machine representing available states of the associated asset, where each defined state is configured to be invoked in response to a detected condition. For example, each defined state may be linked via the metadata to one or more other related data tags defined in the industrial device 302 (e.g., a data tag representing a state of a sensor or switch indicative of the defined state), such that the current state indicated by the State BIDT 602 is a function of the current values of the related data tags.

The value contained in a Rate BIDT 604 can represent an integer or real value of a measured rate of a metric associated with the industrial asset or device. The rate value may be an instantaneous rate or a value representing a rate of change of the metric over time. For example, the rate value contained in the Rate BIDT 604 can represent a temperature, a pressure, a velocity (e.g., a velocity of a conveyor or other motor-driven machine component), an overall equipment effectiveness (OEE), or other such metric.

User-configurable metadata associated with the Rate BIDT 604 can define maximum and minimum values for the corresponding rate value, such that the value contained in the Rate BIDT 604 will not deviate outside the window defined by the maximum and minimum value metadata. The metadata can also identify one or more data sources (e.g., one or more other data tags or input addresses) that determine the event. For example, the metadata for the Rate BIDT 604 can define whether the corresponding rate value is an aggregation of multiple other values contained in other defined data tags. In this regard, the user can define the rate value to be an average or a sum of two or more identified data tags, or an integral of a data tag over time. Another metadata field can be used to designate an engineering unit to be associated with the rate.

The value contained in the Odometer BIDT 606 can represent a cumulative quantity associated with an industrial asset. For example, the Odometer BIDT 606 can be configured to represent cumulative quantity with a rollover value, such as a part count associated with the industrial asset. In such cases, the metadata associated with the Odometer BIDT 606 can include a definition of the rollover value. The Odometer BIDT 606 may also be configured to represent a quantity over a defined time interval, such as an energy consumption associated with the asset. In the case of quantities over a defined time interval, the metadata associated with the Odometer BIDT 606 can include a definition of the time interval, which may be defined in terms of daily start and end times, in terms of a start time and a defined duration of the time interval, or as another time definition format. The metadata associated with the Odometer BIDT 606 can also define one or more data sources that drive the odometer value. For example, the metadata may define a data tag associated with a Cycle Complete event, such that the odometer value will increment when the Cycle Complete data tag goes high. The odometer value may also be defined to be an aggregation of multiple values. In such cases, the metadata may identify two or more data tags whose values are to be aggregated or summed to yield the odometer value. The metadata can also define a unit of measure associated with the odometer value (e.g., bottles filled, operating cycles, megawatt-hours, etc.).

The value contained in the Event BIDT 608 can represent an instantaneous or persistent event associated with an industrial asset. For example, an Event BIDT 608 may represent an instantaneous event such as a push-button event (e.g., "Service Button Pushed"), a sensor event (e.g., "Part Present," "Person Detected," etc.), a safety device event (e.g., "Light Curtain Broken"), or another such instantaneous event. Persistent events that can be represented by Event BIDT 608 can include, but are not limited to, events associated with an alarm status (e.g., "Alarm Unacknowledged," "Alarm Acknowledged," etc.). Other examples of persistent events that can be represented by an Event BIDT 608 can include persistent events with an identifier and a state. For example, events associated with a batch process can include a batch number (an identifier) and an associated event (e.g., "Starting," "Executing," "Complete," etc.). User-configurable metadata associated with the Event BIDT 610 can include identifiers of other data tags whose states, in aggregation, determine the event to be represented by the Event BIDT 610. Alternatively, if the event represented by Event BIDT 608 is a function of only a single input (e.g., a push-button input), the metadata can identify the appropriate input address of the industrial device.

In addition to the metadata described above for each basic information data type, the BIDTs may also include configurable metadata fields that define communication or discovery parameters for the respective BIDTs. For example, each BIDT may include an Update Rate metadata parameter that allows the user to set the rate or frequency at which the BIDT sends its data to a gateway device in order to update a corresponding data presentation. Such metadata fields may allow the user to set the update period for the BIDT (e.g., a 60 second period, which causes the BIDT to send updated values every 60 seconds), or to specify that the BIDT is to send its updated value substantially continuously (e.g., every 5 milliseconds to 10 seconds).

It is to be appreciated that the BIDTs described above in connection with FIG. 6 are intended to be exemplary, and that other types of BIDTs are also within the scope of one or more embodiments of this disclosure.

Figure 7:
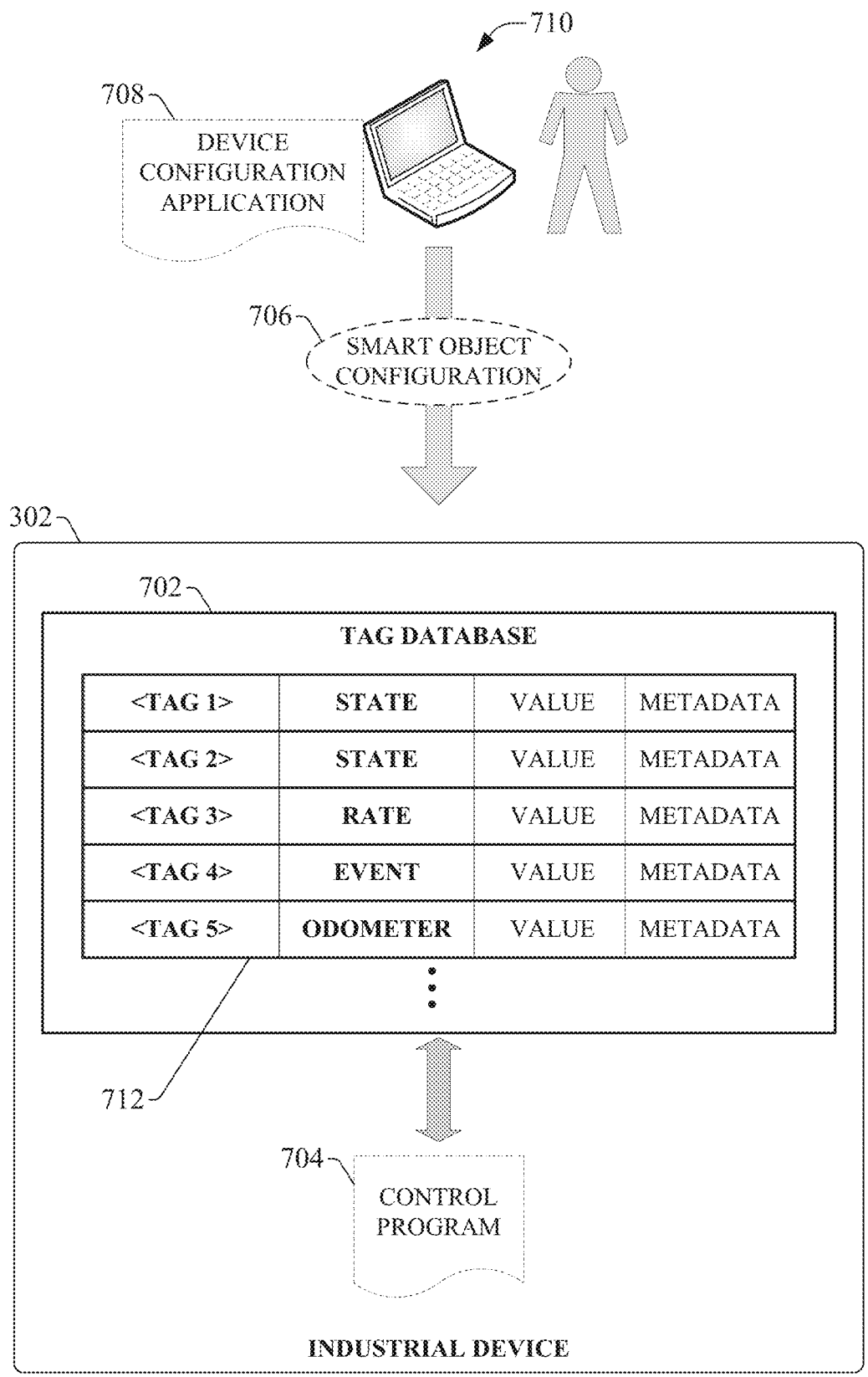
FIG. 7 is a diagram illustrating development of BIDTs in a tag database of an industrial device.

In an example scenario, a user can configure BIDTs in an industrial controller or other industrial device during control program development, along with other data tags to be used by the control program. FIG. 7 is a diagram illustrating configuration of BIDTs in a tag database 702 of an industrial device 302 that supports BIDTs. Industrial device 302 may be, for example, an industrial controller (e.g., a programmable logic controller or other type of programmable automation controller) configured to execute an industrial control program 704 to facilitate monitoring and control of an industrial machine or process. Industrial device 302 includes a tag database 702 that stores data tag definitions. The data tag definitions are configured by a user in tandem with development of control program 704 (e.g., a ladder logic program, a sequential function chart program, etc.), and define data tags 712 of various data types that are used to store and identify analog and digital data values generated and consumed by the control program 704. Example standard data types that can be represented by data tags 712 can include, for example, integer data types, real data types, Boolean data types, etc. In addition to these standard data types, one or more of the data tags 712 can include BIDTs (e.g., BIDTs 602, 604, 606, and 608) associated with the basic information data types described herein. These BIDTs are also referred to as smart tags.

In this example scenario, a user can configure both the control program 704 and the data tag definitions using a device configuration application 708 that executes on a client device 710 (e.g., a laptop computer, a desktop computer, a tablet computer, etc.) that is communicatively interfaced to the industrial device 302. In various embodiments, client device 710 can interface with the industrial device 302 over a hard-wired connection (e.g. a universal serial bus connection, an Ethernet connection, a serial connection, etc.) or over a wireless connection (e.g., near-field, WiFi, etc.) supported by user interface component 314. Device configuration application 708 can execute a program development environment that can be used to develop control program 704 and its associated data tags 712, including any BIDTs to be associated with one or more industrial assets to be controlled using control program 704.

During development, BIDT configuration component 308 of the industrial device 302 can create BIDTs corresponding to any of the BIDT types described above (state, rate, odometer, and event, or other supported BIDT types) in accordance with BIDT configuration input 706 downloaded to industrial device 302 by client device 710. Using device configuration application 708, the user can also configure the metadata associated with each BIDT in order to customize the BIDTs for a given industrial application. For example, for a State BIDT 602 associated with a bottle filling machine to be controlled by industrial device 302, the user may specify the various states to be represented by the tag (e.g., Running, Home, Abnormal, Idle, etc.). In some embodiments, the BIDT configuration component 308 can support a number of pre-defined states that can be selected by the user and associated with a given State BIDT. In addition or alternatively, the user can define the names of one or more of the states to be associated with the State BIDT.

For a Rate BIDT 604 representing a velocity of a conveyor that feeds bottles to the filling machine, the user can specify maximum and minimum values for the velocity value. Accordingly, the Rate BIDT 604 will not generate a velocity value that is outside the range defined by the defined maximum and minimum values, and may generate an error or alarm output if the measured velocity value exceeds the defined maximum or falls below the defined minimum. Another Rate BIDT 604 representing an average temperature may be configured to average multiple analog temperature input values specified by the user in the metadata. For an Odometer BIDT 606 representing a product count (e.g., the number of filled bottles output by the filling machine), the user can configure the associated metadata to define the data tag that triggers an increment of the odometer value (e.g., an input tag or another BIDT representing a "fill cycle complete" event), as well as daily shift start and shift end times between which the value of the Odometer BIDT 606 will increment before being reset to zero. Metadata of an Event BIDT 608 associated with a component of the filling machine can define an input address or data tag representing a state of a device (e.g., a push-button, a photo-sensor, etc.) that determines the event, or an alarm data tag corresponding to an alarm whose state (e.g., Abnormal, Normal, Acknowledged, Unacknowledged, etc.) determines the event.

Figure 8:
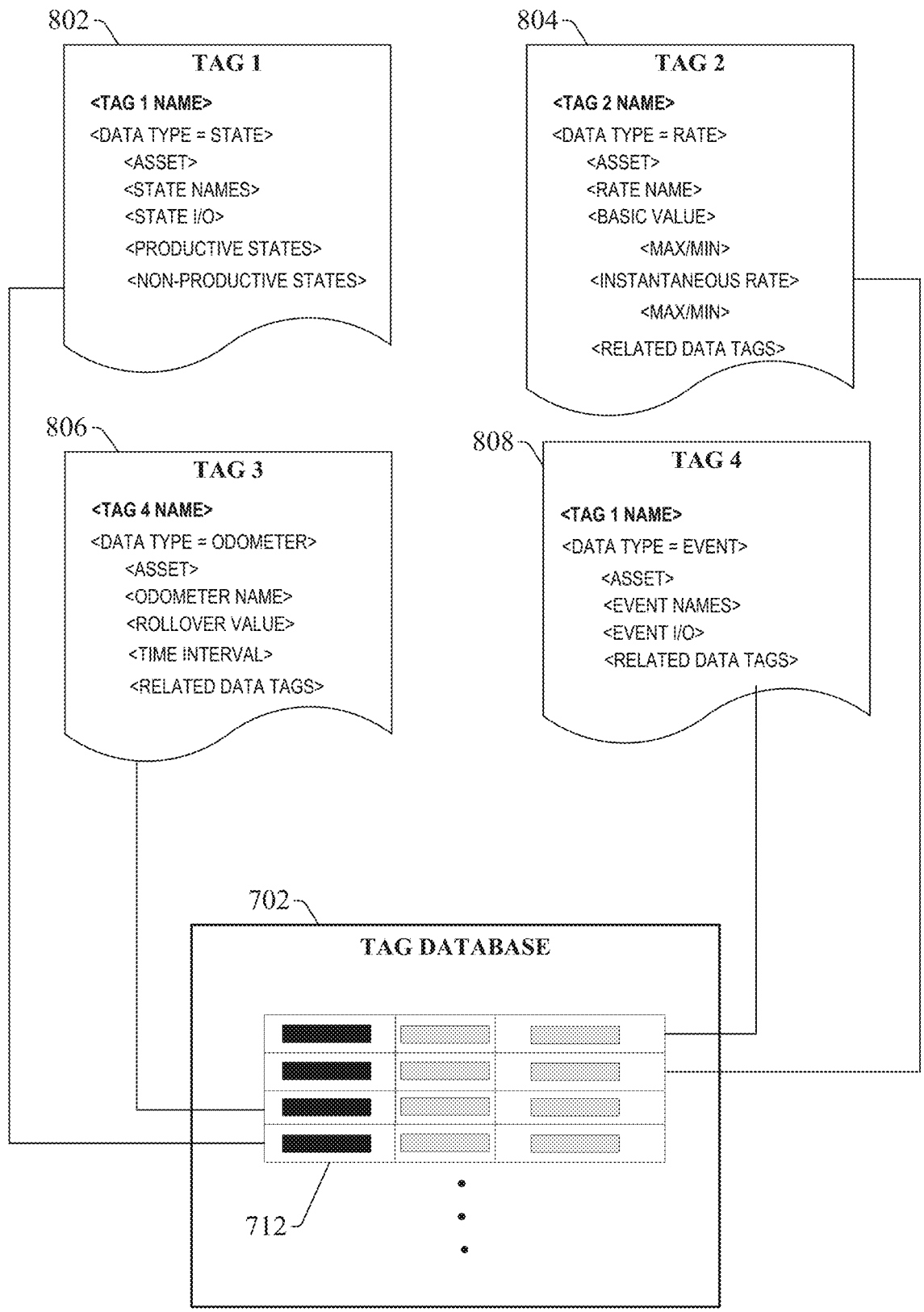
FIG. 8 is a diagram illustrating storage of BIDTs in a tag database.

Once the data tags (both standard and BIDTs) are configured, the tag database 702 stores the configured data tags 712 on memory 320 of industrial device 302, where the data tags 712 are accessible by control program 704. FIG. 8 is a diagram illustrating storage of BIDTs in tag database 702, which shows example data fields for respective types of BIDTs. In the example depicted in FIG. 8, data tag 1 802 is a State BIDT with metadata fields for a name of an industrial asset associated with the tag (e.g., a name of a bottle filling machine, a die cast furnace, a stamping press, etc.), names of the states represented by the tag 802, identification of one or more device inputs or other data tags that determine the states, identification of productive and non-productive states, etc.

Data tag 2 804 is a rate BIDT with metadata fields for an industrial asset name, a name of the rate represented by the rate value (e.g., Line 3 Conveyor Velocity), maximum and minimum values for a basic rate value and/or for an instantaneous rate, related data tags whose values are aggregated to obtain the rate value, a unit for the rate value, or other such metadata fields. Data tag 3 806 is an Odometer BIDT with metadata fields for an asset name, a name of the odometer value (e.g., Bottles Filled, #4 Die Cast Energy Consumption, etc.), a rollover value representing a value of the odometer value at which the value will return to zero, a time interval during which the odometer value is to be incremented (e.g., a start and end time corresponding to a work shift), one or more related data tags that trigger an increment of the odometer value, a unit associated with the odometer value, or other such metadata fields. Data tag 4 808 is an Event BIDT with metadata fields for an asset name, names one or more events represented by the Event BIDT, identification of one or more inputs or data tags that determine the event, or other such metadata data fields.

It is to be appreciated that the metadata fields described above in connection with FIG. 8 are only intended to be exemplary, and that the metadata for a BIDT can have any suitable set of data fields that allow the user to align the BIDT with the industrial application carried out by the industrial device 302.

Figure 9:
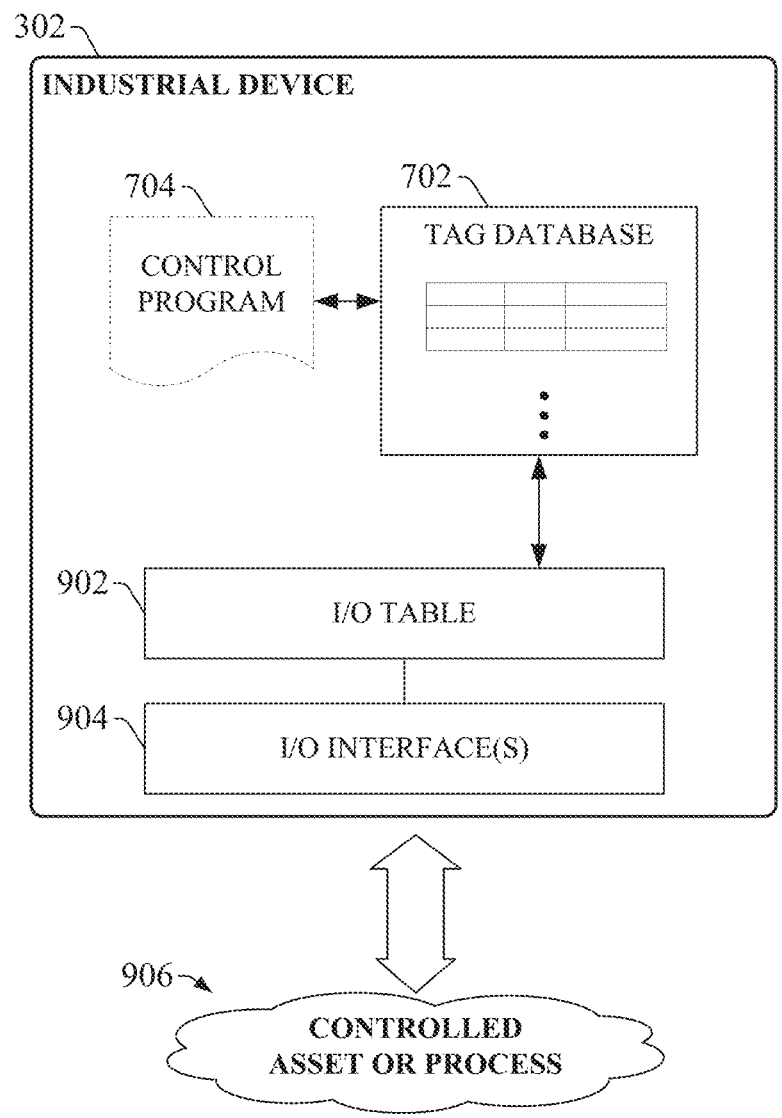
FIG. 9 is a diagram illustrating runtime operation of an example industrial device that supports BIDTs.

After industrial device 302 has been programed and configured (including creation of any BIDTs to be used by the control program 704), the industrial device 302 can be deployed on the plant floor to facilitate control of one or more industrial assets or processes. FIG. 9 is a diagram illustrating runtime operation of an example industrial device 302 that supports BIDTs. In this example, industrial device 302 is assumed to be an industrial controller (e.g., a PLC or other type of programmable automation controller). Controlled asset or process 906 can represent any industrial machine, production line, process, or operation under the control of industrial device 302. Controlled asset or process 906 can have a number of associated input and output devices (e.g., industrial devices 204 of FIG. 2) that receive command signals from or send telemetry data to industrial device 302 over any suitable combination of hardwired or networked connectivity to regulate a controlled operation. Industrial device 302 can also include one or more I/O interfaces 904 that provide hardwired or networked connectivity to the controlled equipment and industrial devices associated with the controlled asset or process 906. These I/O interfaces 904 can include, for example, digital and/or analog input modules, digital and/or analog output modules, networking modules, or the like.

An I/O table 902 within the industrial device's memory 320 can maintain current analog and digital values of the various inputs and outputs read from or written to the I/O interfaces 904. That is, data signals read from field devices by I/O interfaces 904 (e.g., analog or digital input modules) can be written to the I/O table 902 (e.g., by I/O control component 306). Some or all of these input values can be linked to respective data tags (standard or BIDT data tags) maintained in tag database 702, which can be read by control program 704 or by external applications. These input values can then be read from the appropriate data tags by control program 704, which updates its control variables accordingly. Similarly, output values generated by the control program 704 can be written to output data tags defined in tag database 702, causing the corresponding output registers of I/O data table 902 to be updated. The I/O control component 306 then generates appropriate analog or digital output signals at the output points of I/O interfaces 904 in accordance with the updated output values. It is to be appreciated that this overview of industrial controller functionality is only intended to be exemplary, and that the BIDTs described herein can be implemented on other types of industrial controllers having different data update processes, or on different classes of industrial devices.

Figure 10:
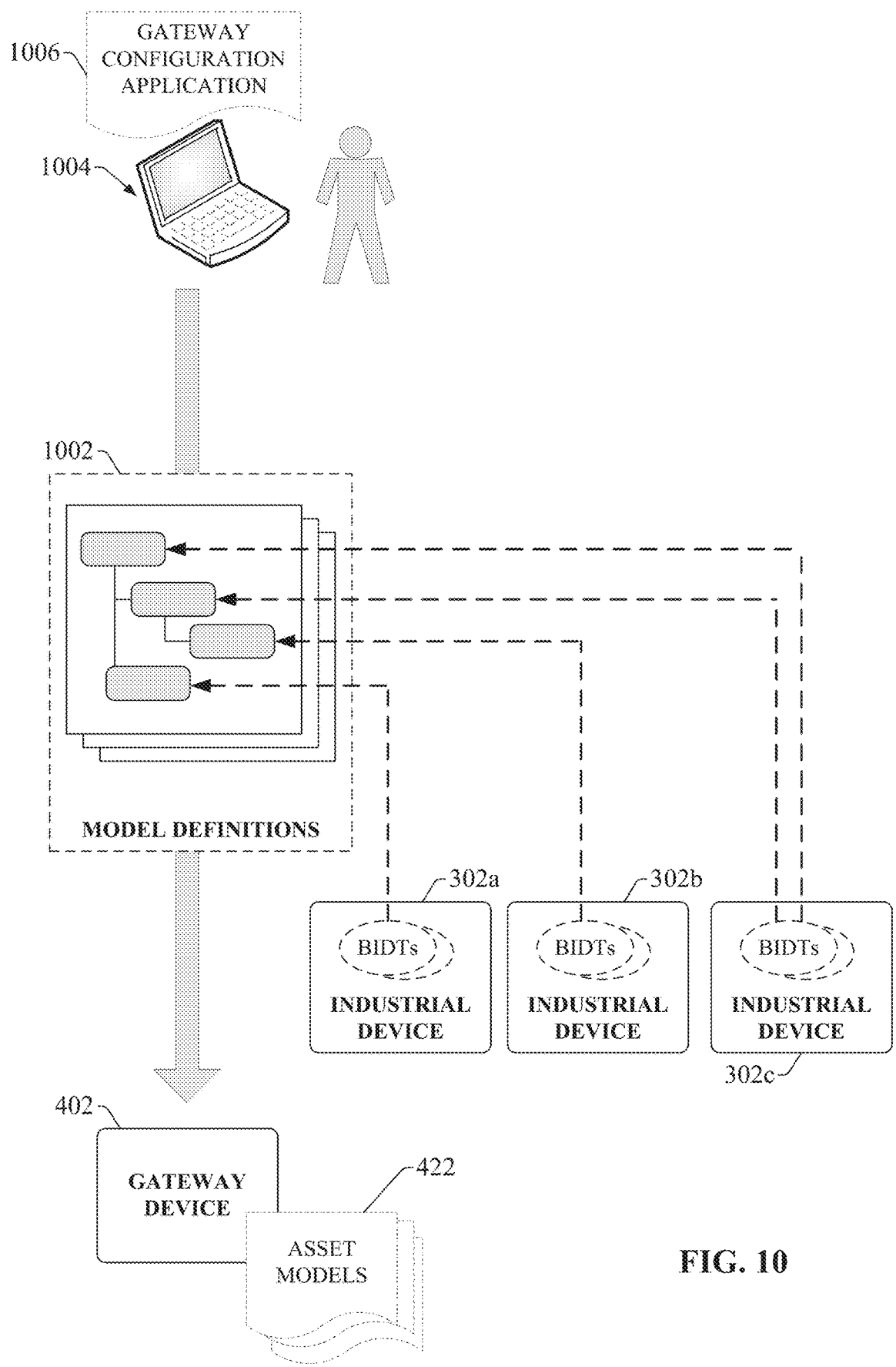
FIG. 10 is a diagram illustrating configuration of a gateway device with one or more asset model definitions.

BIDTs in tag database 702 are discoverable by external systems, so that the BIDT data—with associated metadata customized in accordance with the industrial application carried out by industrial device 302—can be retrieved and organized by those external systems in accordance with user-defined asset and/or plant models. In one or more embodiments, a gateway device 402 can be used to collect, format, and present data from one or more BIDT-capable industrial devices 302. FIG. 10 is a diagram illustrating configuration of a gateway device 402 with one or more asset model definitions. Gateway device 402 can be configured using a gateway configuration application 1006 that executes on a client device 1004 (e.g., a laptop computer, a desktop computer, a tablet computer, etc.). In some embodiments, gateway configuration application 1006 can be an integrated tool of device configuration application 708 used to program and configure industrial device 302.

Gateway configuration application 1006 allows a user to define an asset structure or model of an industrial automation application or a collection of industrial automation applications being monitored and controlled by one or more BIDT-capable industrial devices 302. These asset models 422 define hierarchical relationships between industrial assets, associated industrial devices, production lines or areas, and data generated by the various devices associated with the industrial applications. Using gateway configuration application 1006, a user can define these asset models as model definitions 1002, which can be downloaded to and stored on gateway device 402 as asset models 422.

To facilitate creation of the model definitions 1002, gateway configuration application 1006 can be configured to generate and render suitable configuration screens on client device 1004 that guide the user through the process of defining these asset models 422 for their own industrial applications. The model definitions 1002 can be defined to reference the BIDT data tags defined on one or more industrial devices 302. In particular, the model definitions 1002 can define, as nodes of the hierarchy, hierarchical elements of an industrial asset or collection of assets, and assign selected groups of BIDT data tags to respective elements with which the BIDT data tags are associated (e.g., a node associated with an industrial asset, a unit of equipment associated with the asset, or an industrial device associated with the asset). The asset models 422 are thereby configured by the user to associate the respective BIDTs with selected industrial machines, devices, production lines, and/or plant facilities, as well as to define hierarchical relationships between these elements.

In embodiments in which gateway configuration application 1006 is an integrated tool of device configuration application 708, model building tools of the gateway configuration application 1006 can allow the user to build the model definitions 1002 by browsing to selected BIDTs defined in one or more industrial device configuration files (e.g., the configuration files that are downloaded to the industrial devices 302, and which define the control program 704 and tag database 702). The user can create nodes representing an industrial facility, production lines or areas within the industrial facility, industrial assets (e.g., industrial machine, industrial robots, etc.) within each production line, units of equipment associated with a given industrial asset (e.g., a loader, a pusher, a machining station, etc.), and/or industrial devices (e.g., controllers, drives, etc.) associated with each industrial asset. Selected BIDTs defined on respective industrial devices 302a, 302b, and 302c can then be associated with respective nodes defined in the model definitions 1002 to yield an asset model 422, which can be downloaded to gateway device 402. The asset model 422 allows the user to define a hierarchical asset or plant architecture, and to group BIDTs within the framework in association with selected nodes representing plant production areas or production lines, industrial assets, and/or equipment and devices associated with the assets.

Figure 11:
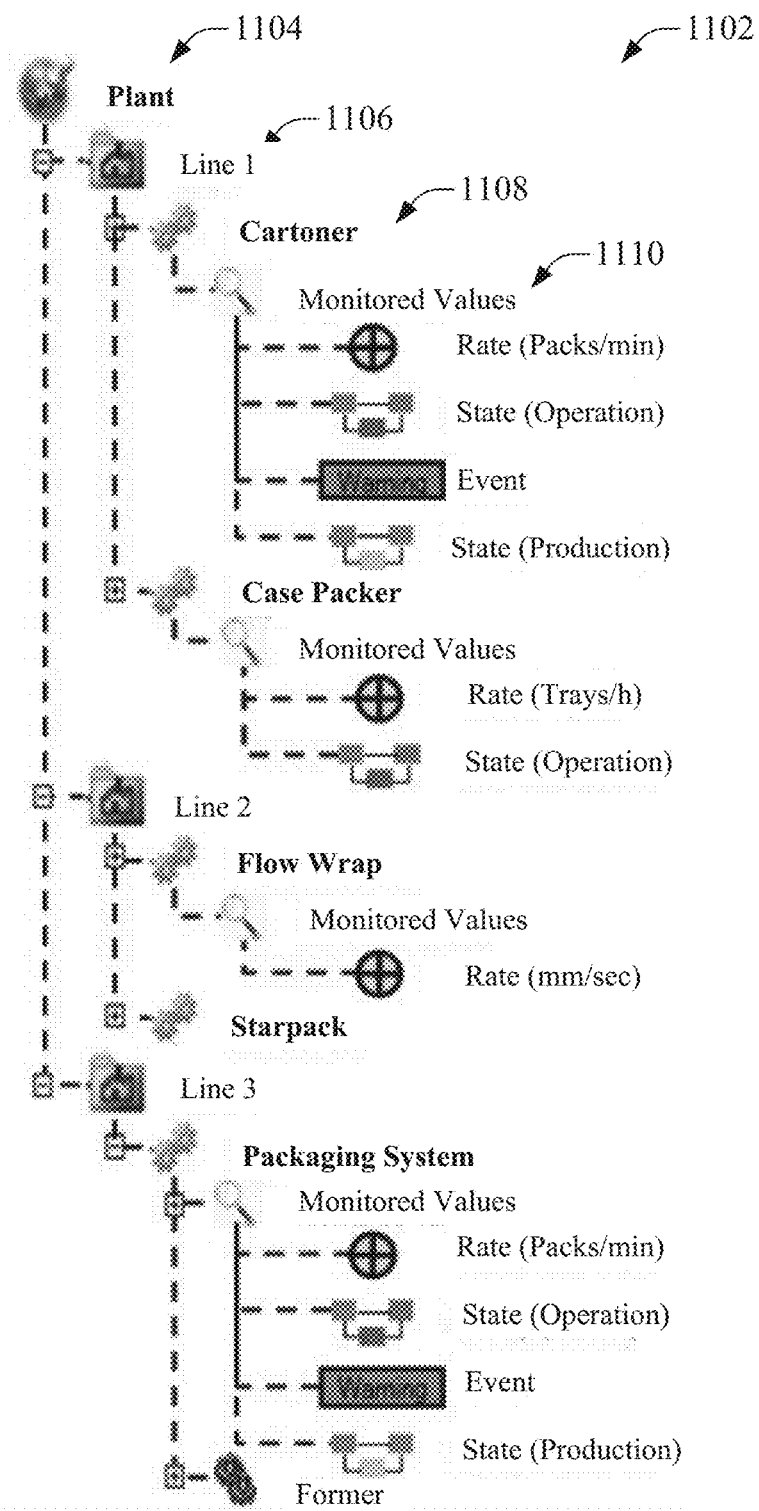
FIG. 11 is a graphical representation of an example asset model formatted as a production model.

Asset models 422 defined on gateway device 402, working in conjunction with the BIDTs defined on industrial devices 302, contextualize data generated by industrial applications and facilitate generation of contextualized data presentations. For a given industrial application, multiple asset models 422 can be created and maintained on gateway device 402, where each asset model 422 can represent a different view of the industrial application. The different views represented by the asset models 422 can be customized to the needs of a particular user role or use case. For example, one asset model 422 for a given industrial application may represent a production model view of the industrial application. FIG. 11 is a graphical representation of an example asset model formatted as a production model 1102. Example production model 1102 has a single plant node 1104, below which are multiple line nodes 1106 (Line 1, Line 2, and Line 3), which are child nodes relative to plant node 1104. Line nodes 1106 represent various production lines within the plant represented by plant node 1104. Each line node 1106 has a number of child machine nodes 1108 representing machines deployed on the line represented by the associated line node 1106 (e.g., Cartoner, Case Packer, Flow Wrap, Packaging System). Each machine node 1108 is associated with a number of monitored values 1110, which are data values obtained from corresponding BIDTs configured on an industrial device 302. The monitored values 1110 may correspond to production and operation statistics, such as a production rate (obtained from a Rate BIDT), operation and production states (obtained from State BIDTs), or line events (obtained from Event BIDTs). As can be seen in FIG. 11, various groups of BIDT data tags—represented by the monitored values 1110—are respectively assigned to a selected machine and line within the plant, as defined by the asset model definition. This example production model 1102 yields a view of the industrial facility (comprising Lines 1, 2, and 3) that may be suitable for an operator or shift manager responsible for daily operation of the lines.

Figure 12:
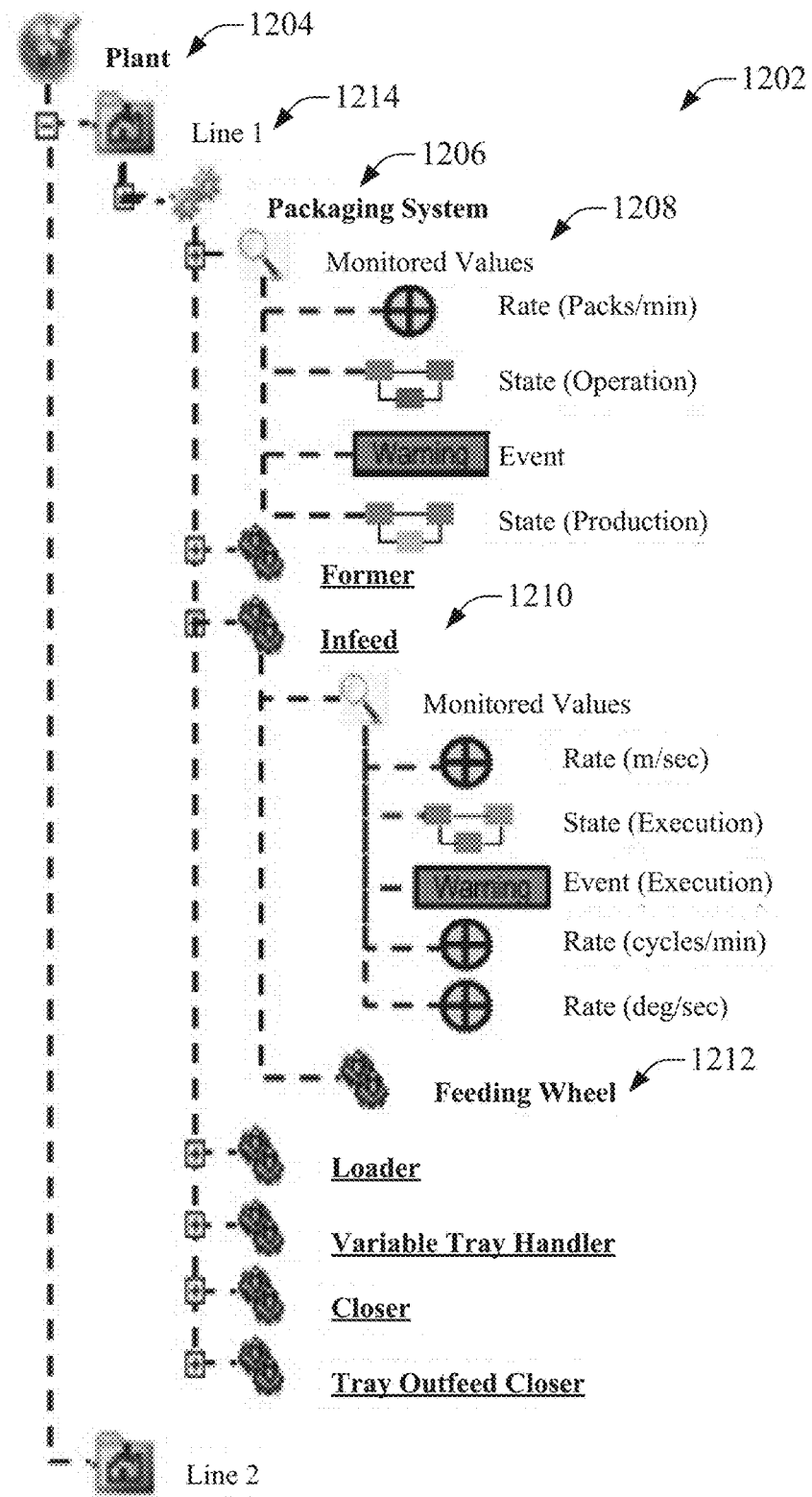
FIG. 12 is a graphical representation of an example asset model formatted as a design model.

FIG. 12 is a graphical representation of an example asset model formatted as a design model 1202. Design model 1202 is configured to present a view of data from the industrial application in a contextualized manner suitable for a plant engineer, original equipment manufacturer (OEM), or system designer. Similar to production model 1102, design model includes a plant node 1204 with a number of child line nodes 1214. In this example, child nodes for each line node 1214 can include machine nodes 1206 (e.g., Packaging System) representing a machine of the line represented by the line node 1214, as well as stage nodes 1210 representing individual stages of the machine (e.g., Former, Infeed, Loader, etc.). Each machine node 1206 can be associated with monitored values 1208 (obtained from BIDTs configured on relevant industrial device 302) relating to production and operation of the machine. Each stage node 1210 can be associated with monitored values (also obtained from respective BIDTs) representing current operating statistics for that stage of the machine. Some stage nodes 1210 may also have child nodes representing individual equipment components of that stage (e.g., equipment node 1212, which represents a finding wheel that is a part of the infeed). As with the production model 1102 depicted in FIG. 11, a user can configure design model 1202 by defining the various hierarchical nodes of the model, and assigning selected groups of BIDT tags (the monitored values) to selected nodes of the model. The system allows the user to define the nodes of the model according to any user-defined hierarchical plant or enterprise structure, where the structure can comprise hierarchical levels defined by the user (e.g., production lines, production cells, production stations, etc.).

It is to be appreciated that the production model 1102 and design model 1202 described above are only intended to be exemplary, and that the asset models described herein are not limited to these two types of views. In general, any suitable user-defined asset model 422 that leverages data from the BIDTs to present a contextualized view of industrial asset data is within the scope of one or more embodiments of this disclosure.

As can be seen in the example asset structure models of FIGS. 11 and 12, the BIDTs are properties of their associated parent nodes. For example, the monitored values 1110 of the Cartoner machine—which are obtained from respective BIDT data tags on one or more industrial devices 302—are properties of the Cartoner machine node 1108. During model development, the user can define the various plant nodes, line nodes, product nodes, equipment nodes, or other types of nodes that make up an industrial enterprise as a whole, or a particular set of industrial applications within the industrial enterprise, and define the hierarchical relationships between these nodes. The user can then assign selected BIDTs to their appropriate nodes to yield the asset model, which can be downloaded and stored on the gateway device 402.

The BIDT publishing component 310 of each industrial device 302 exposes the BIDTs of the industrial device 302 to the asset models 422 defined on the gateway device 402. Thus, when the gateway device 402 is deployed on a plant network or on a cloud platform having secured remote access to the industrial devices 302, the asset models 422 can cause the gateway device 402 to retrieve data from the respective BIDTs as well as the metadata parameters associated with each BIDT in order to generate contextualized presentations of the industrial application data in accordance with the asset models 422.

Figure 13:
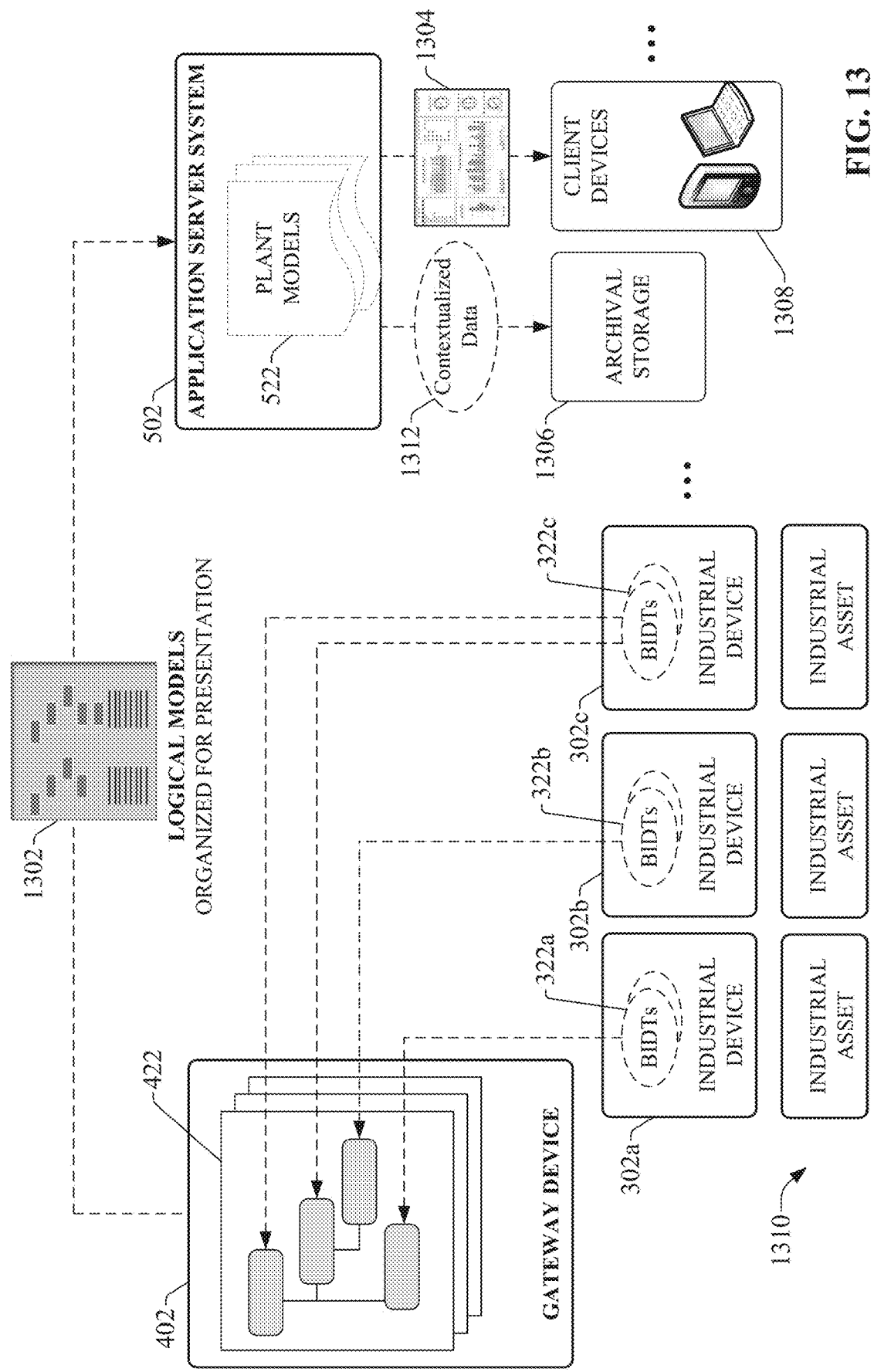
FIG. 13 is a diagram illustrating the flow of BIDT data from industrial devices to an application server system that delivers contextualized presentations of the BIDT data.

FIG. 13 is a diagram illustrating the flow of BIDT data from industrial devices 302 to an application server system 502 that delivers contextualized presentations of the BIDT data. In this example, multiple industrial devices 302 (e.g., 302a, 302b, and 302c) have been programmed to control respective industrial assets 1310 (e.g., industrial machines, production lines, etc.). Each industrial device 302 has been configured with a number of BIDTs 322 (or smart tags), as described above in connection with FIGS. 6-9. A gateway device 402 has been configured with various asset models 422, as described above in connection with FIGS. 10-12. Asset models 422 define respective customized views of the BIDT data.

During operation, industrial devices 302a-302c monitor and control their respective industrial assets 1310 (e.g., via respective input and output devices associated with the respective industrial assets 1310). Gateway device 402 is networked to the respective industrial devices 302a-302c. For example, gateway device 402 may be an on-premises device that resides on the same plant network as industrial devices 302a-302c. In another implementation, gateway device 402 may reside on a cloud platform and is capable of securely accessing the plant network from the cloud platform (e.g., through a firewall device).

The BIDT publishing component 310 of each industrial device 302 exposes the data and metadata associated with each configured BIDT 322 to the gateway device 402, rendering the BIDT data and metadata accessible and retrievable by the discovery component 406 of the gateway device 402. For each model 422 defined on gateway device 402, the model configuration component 408 of the gateway device 402 retrieves the data and metadata for each BIDT referenced by the model 422 (as specified by the user-defined model definitions 1002) and creates a logical model 1302 of the data based on the model 422 and the BIDT data and metadata. Logical model 1302 organizes the data from the BIDTs in accordance with the hierarchical asset models 422 defined by the user.

Gateway device 402 includes an application server interface component 410 (see FIG. 4) that communicatively connects the gateway device 402 to an application server system 502. Although application server system 502 is depicted in FIG. 13 as being a separate system relative to gateway device 402, in some embodiments the application server system 502 can be an integrated application of the gateway device 402. Application server system 502 is configured to receive the logical model 1302 from gateway device 402 and serve data display presentations 1304 to authorized client devices 1308. For example, the presentation component 508 of application server system 502 can generate an application view of the BIDT data based on the logical model and associated BIDT data and metadata received from the gateway device 402, and the destination interface component 510 of the application server system 502 sends this application view to one or more client devices 1308 as data display presentation 1304. In some scenarios, application server system 502 can also store selected subsets of the contextualized data 1312 in archival storage 1306 (e.g., a historian device, cloud-based storage, etc.) that is integrated with or communicatively connected to application server system 502.

Figure 14:
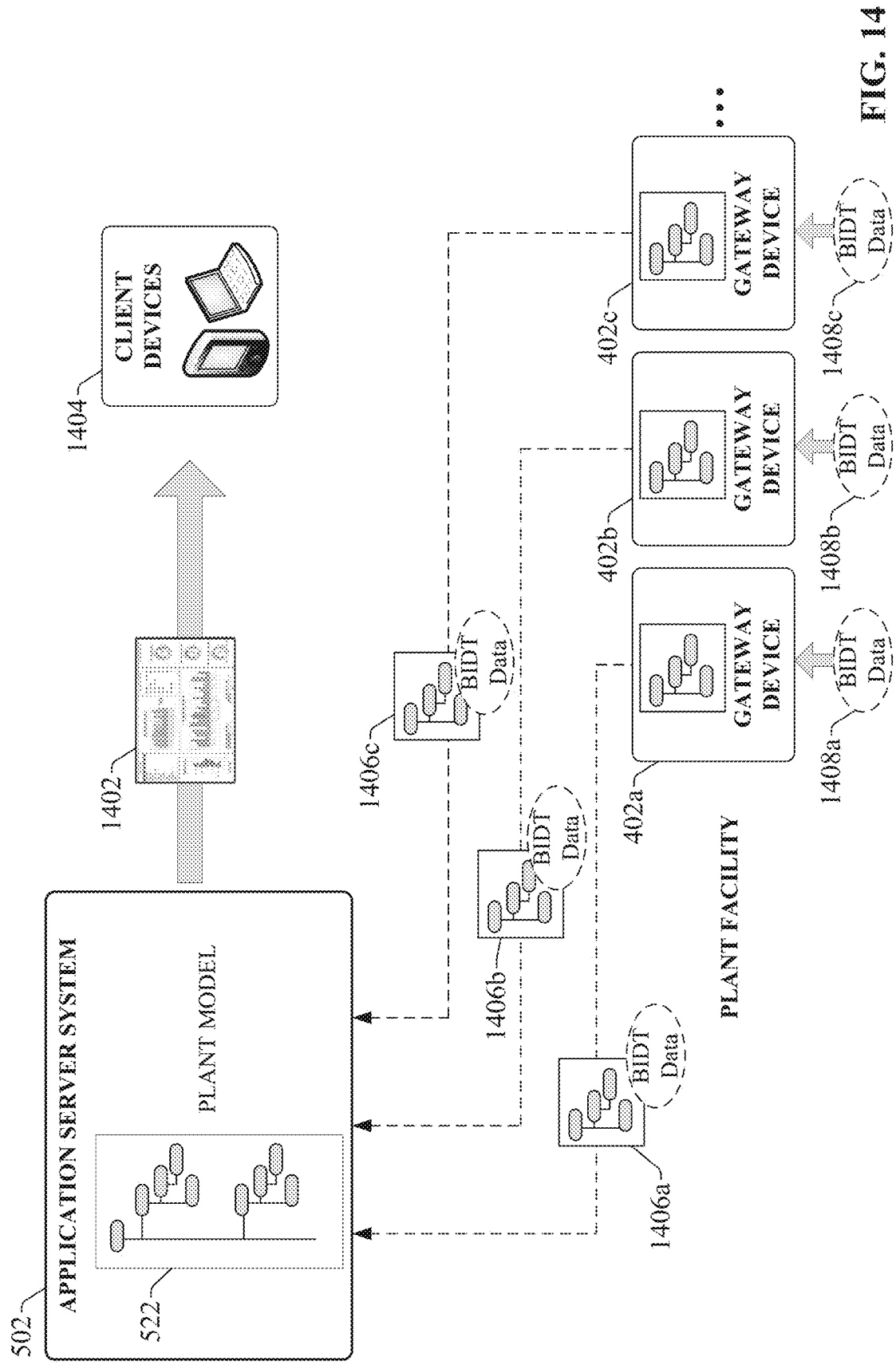
FIG. 14 is a diagram illustrating collection and integration of logical asset models into a common plant model by an application server system.

Data display presentations 1304 can present the contextualized data from the BIDTs in a format that generally aligns with the plant and asset hierarchy defined by the asset models 422. In the example depicted in FIG. 13, the application server system 502 is depicted as receiving logical models 1302 and BIDT data and metadata from a single gateway device 402 that receives and contextualizes BIDT data from multiple industrial devices 302a-302c. As illustrated in FIG. 14, in some embodiments application server system 502 can be configured to collect logical models 1302 and BIDT data and metadata from multiple gateway devices (e.g., gateway devices 402a-402c), and integrate the logical models 1302 into a common plant model 522. In an example implementation, gateway devices 402a-402c may reside at different areas of a given plant facility, and application server system 502 can be either an on-premise device or a cloud-based system that receives the defined asset models 1406a-1406c from the respective gateway devices 402a-402c, together with the data and metadata from the BIDTs defined on each gateway device 402a-402c. In another example implementation, gateway devices 402a-402c may reside at different geographically diverse industrial facilities whose plant and/or office networks are linked to a cloud platform on which application server system 502 executes.

Gateway devices 402a-402c collect BIDT data 1408a-1408c from respective industrial devices (not shown in FIG. 14), as described in previous examples. Each of the gateway devices 402a-402c is configured with one or more asset models 1406a-1406b, as also discussed above. The application server system 502 retrieves the asset models 1406a-1406c from the respective gateway devices 402a-402c, and the plant model component 506 of the application server system 502 integrates the asset models 1406a-1406c into an aggregate plant model 522, which is used as the basis for formatting and presenting the BIDT data via data presentations 1402.

The contextualized plant data provided by the device-level BIDTs 344, together with the asset models 422 which define hierarchical relationships between items of this contextualized data, can transform unstructured industrial process data to structured, contextualized data. During operation, the gateway device 402 can collect the contextualized BIDT data from industrial devices on the plant floor, structure this data in accordance with the asset models 422, and store the resulting organized and contextualized data—e.g., in local or cloud storage—in substantially real-time. For a given industrial process, this structured data can be collected at a rate determined by a defined frequency or trigger condition (e.g., completion of an industrial process applied to an item of product), depending on the sampling required to capture the industrial process in a meaningful way.

As noted above, the BIDT data collected by the gateway device 402 from the industrial devices 302 is determined by BIDTs defined by the asset models 422. While the contextualization and structuring of the stored process data can assist analytic systems in obtaining meaningful insights into the industrial process, a given analytic use case of interest—e.g., quality, energy, overall equipment effectiveness (OEE), etc.—may only be a function of a smaller subset of this collected data. Assessing performance of the industrial process across various metrics can be excessively time consuming using big data approaches, whereby the full set of available BIDT data is collected and analyzed. Insights obtained using such a big data approach may not be generated in time for the results to be used proactively to notify personnel of a process quality concern or to alter the industrial process to correct the performance or quality degradation.

To address these and other issues, one or more embodiments of the gateway device 402 can support feature engineering tools that allow a user to easily define condensed, case-specific output models and associated algorithms for assessing respective different KPIs in an industrial process-aligned manner. These tools can leverage the data organization made possible by the BIDTs 322 and asset models 422 to create an intuitive and simple workflow for configuring feature engineering analytics for an industrial process. The output models 424 created using the feature engineering tools can define a limited subset of the total set of available data points that are relevant to a particular use-case or KPI. The gateway device 402 can record or stream this reduced set of data in accordance with a defined sampling strategy, and user-defined algorithms can be applied to this reduced data set to assess the health of the KPI in question.

Figure 15:
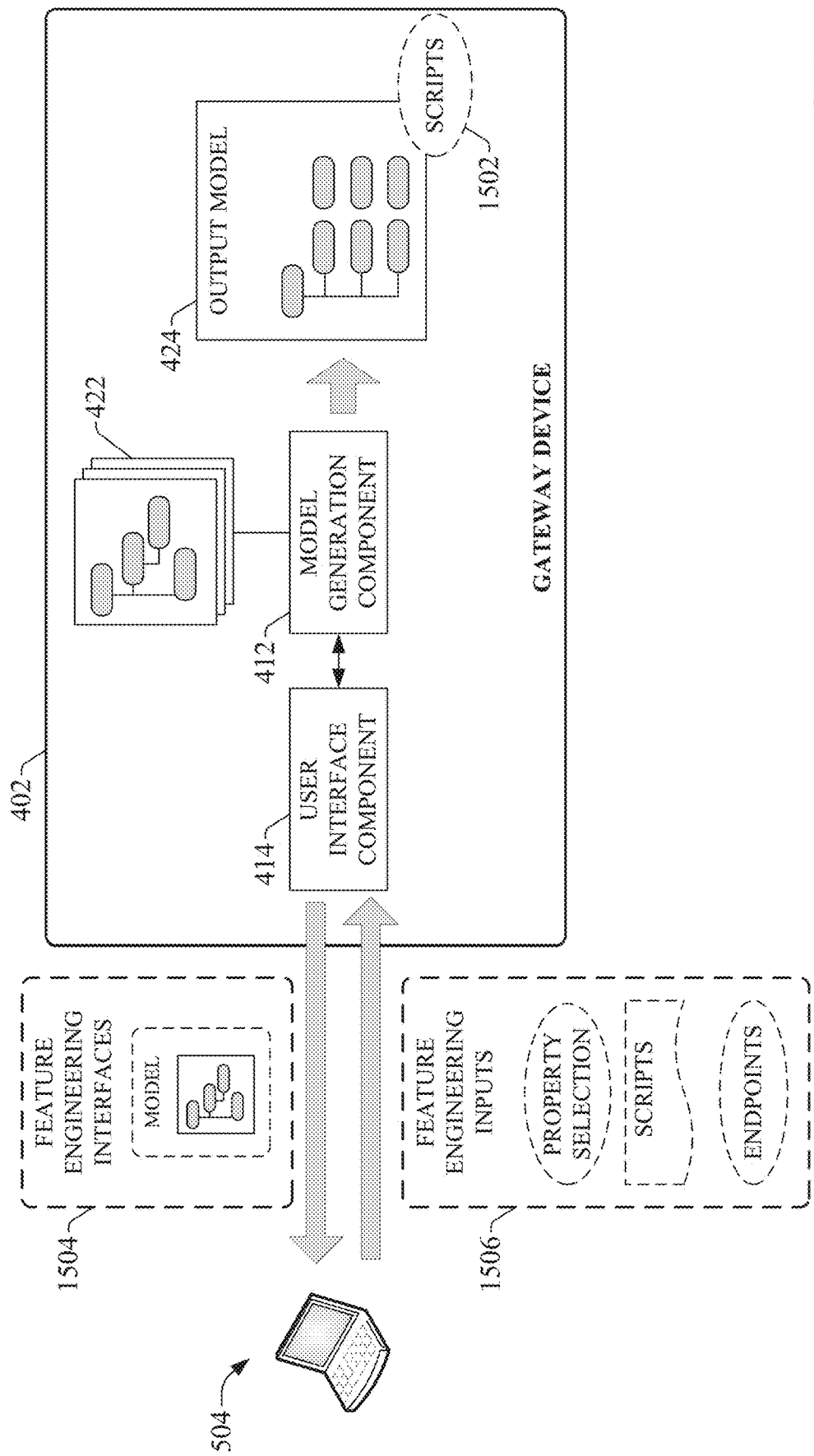
FIG. 15 is a diagram illustrating a workflow for creating a condensed, KPI-specific output model using feature engineering configuration tools supported by a gateway device.

FIG. 15 is a diagram illustrating a workflow for creating a condensed, KPI-specific output model 424 using feature engineering configuration tools supported by the gateway device 402. Although the examples illustrated herein depict the condensed output models 424 being created via interaction with the gateway device 402—that is, using a feature engineering interface 1504 generated by the gateway device's user interface component 414—in some embodiments the feature engineering tools described herein can be implemented on a separate system having access to the asset models 422, and the resulting output models 424 can be installed on the gateway device 402 for execution. As in previous examples, gateway device 402 may be an on-premise device that resides on the same plant network as the industrial devices from which BIDT data is to be collected, or may reside on a cloud platform and collect data from the industrial device via a secure channel between the cloud platform and the industrial devices.

User interface component 414 can generate and deliver, to a client device 504, a feature engineering interface 1504 that guides the user through the process of creating condensed, KPI-specific output models 424 from an existing asset model 442 (or plant model 522), and creating associated scripts 1502 for assessing the health of respective KPIs of an industrial process. In general, each output model 424 is specific to a particular KPI or other metric of the industrial process that is of interest, and whose health is to be assessed on a substantially real-time basis. Example KPIs can include, but are not limited to, fluid viscosity, component tightness, a process temperature, or other such performance indicators.

The user can submit feature engineering configuration inputs 1506 via interaction with the interface 1504. These configuration inputs 1506 define the output model 424 as a selected subset of asset model properties (corresponding to BIDT data tags or data points), define scripts 1502 to be applied to the selected properties, and define an endpoint for the resulting output model 424. To begin the process of defining an output model 424, the feature engineering interface 1504 allows the user to select an asset model 422 from which a condensed KPI-specific output model 424 will be developed. The user can also select a product identifier of a product for which the output model 424 is to be defined (that is, a product that is processed or manufactured by the industrial systems being monitored). Based on the selected model 422 and product, the feature engineering interface 1504 renders an interactive hierarchical view of the asset model 422 and its associated BIDT data points.

Figure 16:
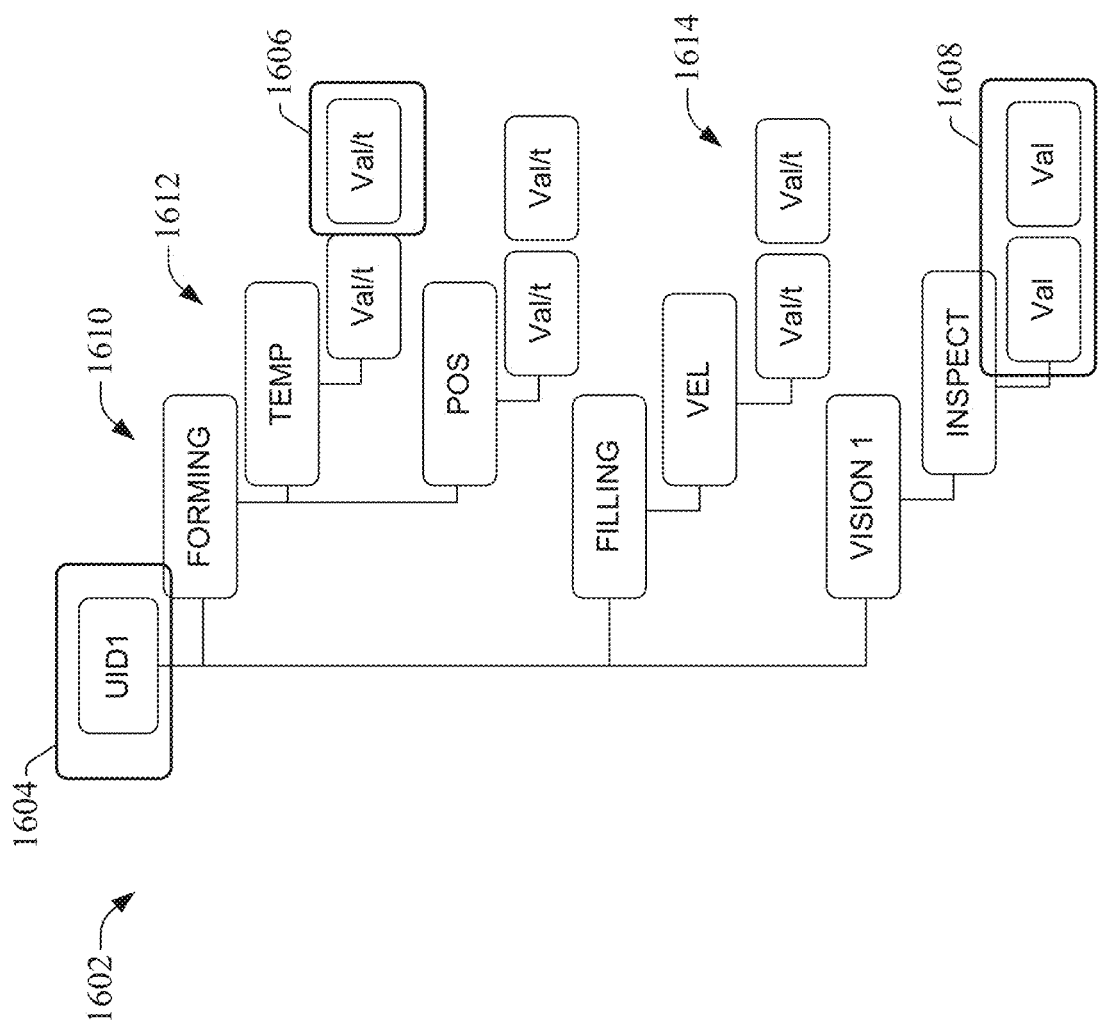
FIG. 16 is an example interactive model view that can be rendered by the user interface component of a gateway device.

FIG. 16 is an example interactive model view 1602 that can be rendered by the user interface component 414. The model view 1602 depicts the hierarchical organization of data points (corresponding to BIDTs 322 defined on industrial devices operating on the plant floor) defined by the asset model 422 selected by the user. In the illustrated example, the selected product—represented by product identifier UID1—is to be processed by different machining stations represented by respective machine nodes 1610, including a forming machine (FORMING), a filling machine (FILLING), and a vision system (VISION 1) that uses optical inspection to verify that each unit of the product was processed correctly. Below each machine node 1610 are defined one or more property nodes 1612 that represent various measured process properties available from the corresponding machine (e.g., temperature, position, velocity, vision inspection result, etc.). During operation of the industrial process, values of these properties are obtained by the gateway device 402 from the BIDTs 322 corresponding to those properties. These values are represented by data nodes 1614 defined under their corresponding property nodes 1616. Depending on the type of machine or process being monitored, there may be more than one value for a given property if multiple instances of that property are available from the machine (e.g., multiple temperature or velocity measurements for respective different aspects of a process carried out by the machine).

Through interaction with the model view 1602 rendered on the feature engineering interface 1504, the user can select which properties are relevant to, or have a significant impact on, the KPI of interest. In some embodiments, these selections can be made by selecting the data nodes 1614 corresponding to the relevant properties. In the example illustrated in FIG. 16, the user has selected the forming machine temperature value represented by data node 1606 as well as the two vision machine inspection result values represented by nodes 1608. Since a given KPI may be a function of only a relatively small subset of the available BIDT data points, this property selection process allows the user to define the reduced subset of relevant data points that are to be collected and analyzed for each KPI of interest.

Based on the user's selection of properties from the model view 1602, the model generation component 412 generates an output model 424 based on the user's selected properties. FIGS. 17a and 17b are representations of example output models 424a and 424b for respective two KPIs—viscosity and tightness—generated based on a user's selection of relevant properties from the model view 1602. Each reduced or condensed model 424 includes only the properties (BIDT data points) that the user had selected from the model view 1602 as being relevant to the KPI of interest.

Additionally, for each output model 424, the user can create, via interaction with feature engineering interface 1504, one or more scripts 1502 that define relationships between the selected properties and the KPI for which the output model 424 is being built. These scripts 1502 can be written to apply substantially any mathematical function— e.g., averages, integrals, differentials, maximum or minimum values, or other such functions—to the user-selected set of properties. In general, scripts 1502 can define, mathematically, individual or collective states of the selected properties that translate to an acceptable or unacceptable state for the KPI. The gateway device 402 can support any suitable language for creating scripts 1502, including text-based scripting languages. Some embodiments of gateway device 402 may also support the use of a graphical script builder for creating scripts 1502.

As illustrated in FIGS. 17a and 17b, scripts 1502 may be developed for, and associated with, individual properties of an output model 424. These property-specific scripts 1502 can apply transforms to their associated properties, including but not limited to averaging, normalizing, application of maximum or minimum limits, integrating, differentiating, or applying other such transforms. A script 1502 may also reference multiple properties of the output model 424 as variables, such that the script 1502 defines an aggregate state of the corresponding KPI as a function of collective states of the properties, which are referenced as variables in the script 1502.

As part of the output model definition, the user can also define, for each KPI-specific output model 424, a data process timing or a condition that will trigger a recording and analysis of the selected properties defined by the model 424. In some scenarios, if the KPI of interest requires highly granular data to accurately assess the health of the KPI, the user may choose to record values of the selected properties for every unit of interest. If the unit of interest is a unit of product, this may involve recording values of the properties for each unit of product cycled through the industrial process. If the unit of interest is a component of the industrial process itself (e.g., a machine component such as a flight bar, a conveyor, an actuator, or other such components), the properties values can be recorded for each cycle of the industrial process. Alternatively, if less granular data is sufficient for determining the health of the KPI (e.g., the KPI is not expected to change appreciably between consecutive units of product), the user may choose to record values for ever $N^{th}$ unit of interest (or every $N^{th}$ cycle of the process), where N is an integer (e.g., every $10^{th}$ unit, every $100^{th}$ unit, etc.).

The user can also define an endpoint, or destination, for the data or analytic results generated by the output model 424. In various examples, the endpoint may be specified as an on-premise or remote database (e.g., cloud-based storage), an industrial device whose operations are dependent on the health of the KPI being assessed, a notification or reporting system, or other such destinations.

Figure 18:
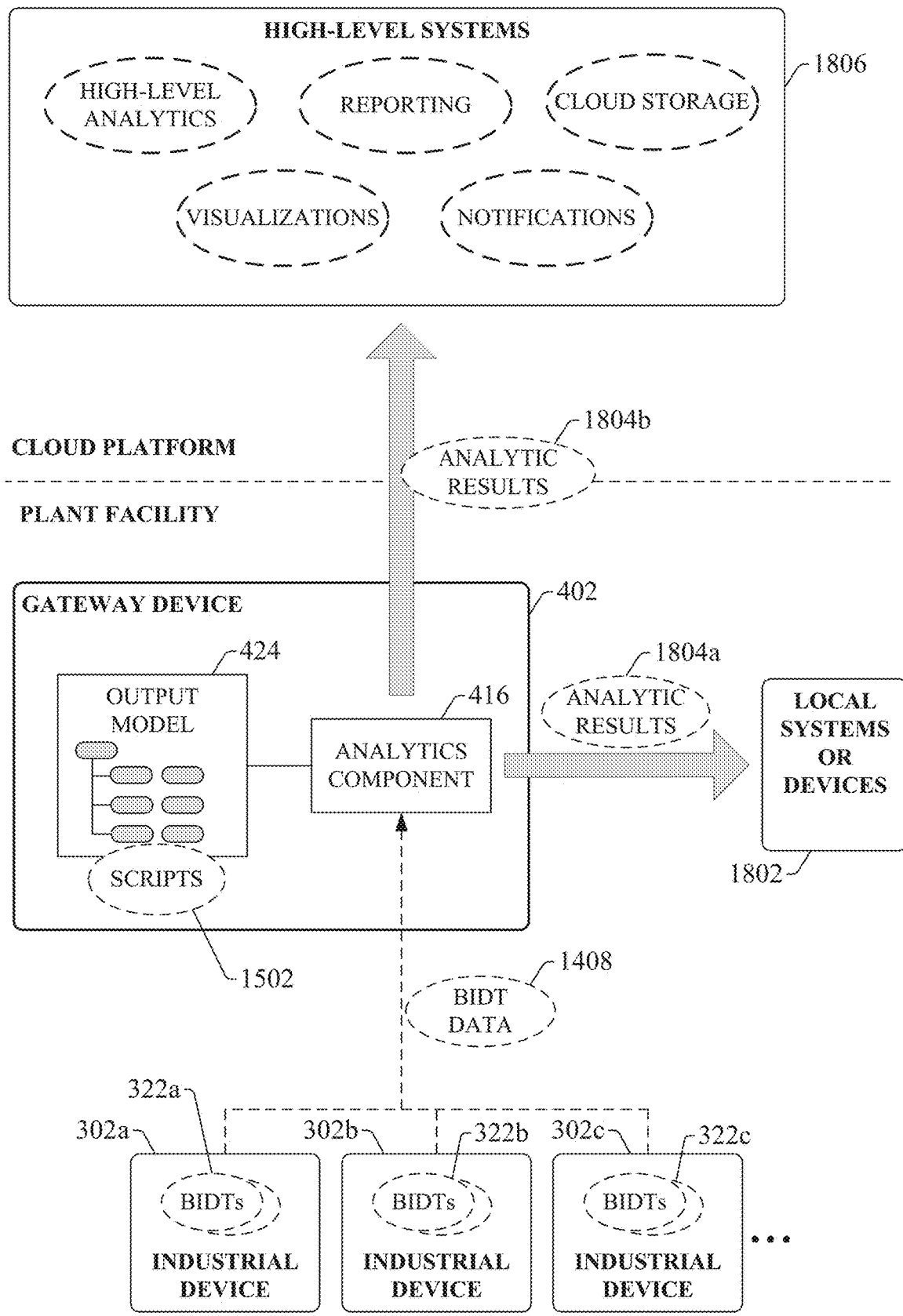
FIG. 18 is a diagram illustrating collection and processing of BIDT data by a gateway device in accordance with a condensed output mode.

The resulting output model 424 defines the subset of the total available BIDT data points that are to be collected and analyzed for each unit of interest that will be processed by the machines on the plant floor. The scripts 1502 associated with the models 424 define how the values of these data points translate to an overall health of the corresponding KPIs. Once created, the output model 424 can be stored on the gateway device 402, which collects and processes BIDT data 1408 in accordance with the output models 424 and their associated scripts 1502. FIG. 18 is a diagram illustrating collection and processing of BIDT data 1408 by the gateway device 402 in accordance with the condensed output model 424. During operation, the machines and production lines that manufacture units of a given product—including machines defined in the asset model 422—are monitored and controlled by one or more BIDT-capable industrial devices 302. As units of interest are processed by the machines, the gateway device 402 collects BIDT data 1408 from BIDTs 322 of the industrial devices 302. Specifically, the gateway device 402 collects and stores data values from the subset of available BIDTs 322 defined by the condensed KPI-specific output models 424 registered on the gateway device 402. Thus, relative to the scenario described above in connection with FIG. 13, in which data and metadata is retrieved from all BIDTs 322 referenced by the asset model 422, the gateway device 402 collects a reduced, down-sampled subset of data (and BIDT metadata if appropriate) from only those BIDTs 322 referenced by the condensed output models 424, which were created by the user from the asset models 422.

When an analysis event for an output model 424 is triggered, the gateway device 402 collects and stores a set of BIDT data 1408 for the output model 424 and executes an analysis of the data 1408 at times determined by the data process timings that were defined for the model 424 by the user. As noted above, the analysis event is triggered based on the data process timings that were defined for the output model 424 by the user. The analysis may be triggered for each new unit of interest that passes through the industrial process, for every $N^{th}$ unit of interest (where N is an integer greater than 1), or according to another data processing criterion. When an analysis event is triggered, the property values for the current unit of interest (corresponding to the data nodes 1614 illustrated in FIG. 16) are collected from the appropriate BIDTs 322 by the gateway device 402 when those values become available; e.g., when the unit of interest has been processed by all machines. Once the BIDT data 1408 and metadata has been collected for the full output model 424 for the current unit of interest, the gateway device's analytics component 416 executes the used-refined scripts 1502 associated with the model 424 against the collected data values to determine the state, health, or acceptability of the corresponding KPI.

Results 1804 of this analysis can be directed to the endpoint systems or devices defined by the user during the model creation workflow. In an example scenario, the analytics component 416 can be configured to send a result 1804*a* of the analysis (that is, a result of executing scripts 1502 against the collected BIDT data values) to a local system or device 1802. This may involve sending the set of collected BIDT data values, as well as the assessment of the KPI's health as determined by the scripts 1502, to a local database or other storage system for archival storage. In another example, the analytics component 416 can send, as the analytic result 1804*a*, a command directed to an industrial device to alter an operation of a downstream machine based on the assessment of the KPI's health. In an example control scenario, the gateway device 402 can be configured to instruct the machine to reject the current unit of product or a current batch of products in response to determining that the result of the KPI assessment is indicative of a product quality concern.

The gateway device 402 may also be configured to send analytic results 1804*b* to high level systems 1806 for archival storage, analysis, reporting, or notification purposes. These high level systems 1806 may execute on a cloud platform that is accessible to the gateway device 402, or may execute on a server within the plant facility. In an example scenario, the gateway device 402 can instruct a notification system to send a notification to client devices of specified personnel in response to a determination that the result of the KPI assessment—that is, the result generated by the scripts 1502—does not satisfy a quality or performance criterion. The gateway device 402 can also provide the collected BIDT data 1408 and/or analytic results 1804*b* to a reporting or visualization system (e.g., a cloud-based HMI) or to a high level analytics system such as a manufacturing execution system (MES) or enterprise resource planning (ERP) system. These various endpoints can be configured by the user as part of the output model creation workflow.

Figure 19:
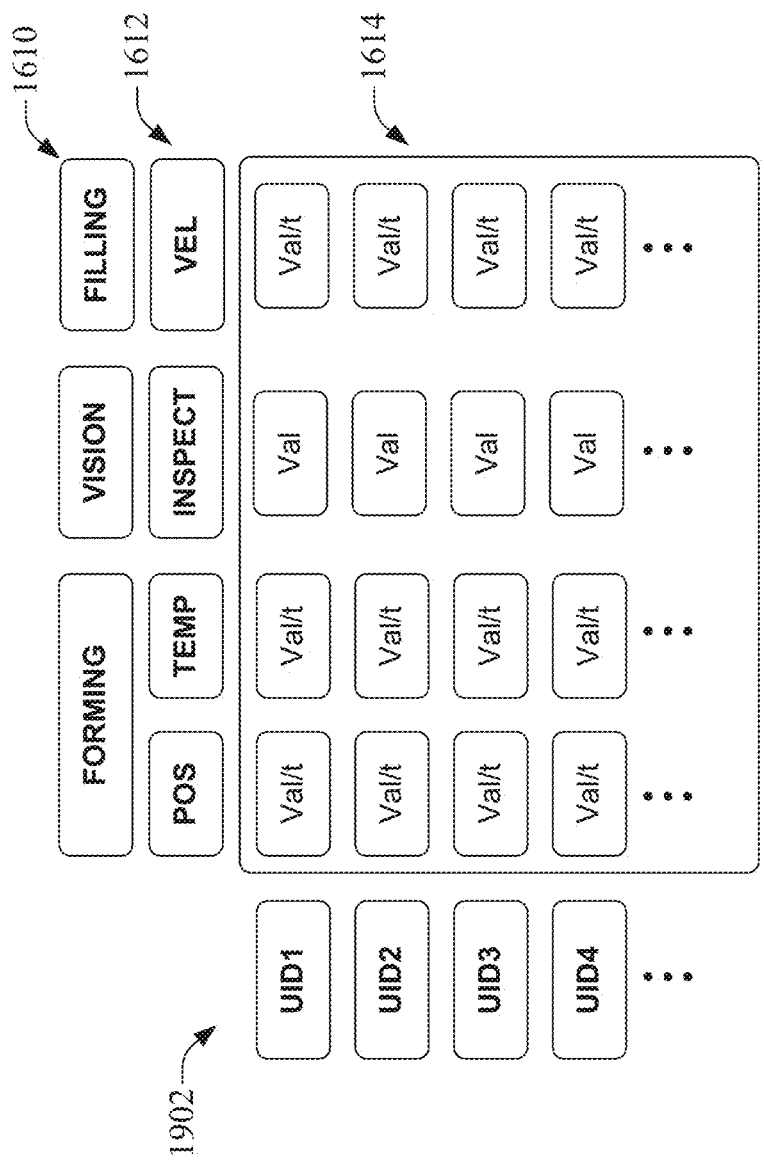
FIG. 19 is an example data storage schema in which values of properties defined by an output model are stored for multiple unique identifiers.

The gateway device 402 can be configured to store the collected BIDT data values such that the values are aligned according to unique identifiers (e.g., product identifiers or machine cycle identifiers). FIG. 19 is an example data storage schema in which values of the properties defined by the output model 424 are stored for multiple unique identifiers. For each unique identifier for a unit of interest (UID1, UID2, etc.), the gateway device 402 stores a set of values corresponding to the subset of available BIDTs 322 defined by the output model 424; that is, the properties selected by the user from the asset model 422 for inclusion in the condensed output model 424, as shown in FIG. 16. Each stored value corresponds to a data node 1614 selected by the user from the interactive model view 1602 during the output model creation workflow. As such, each value can be identified by its hierarchical model location in terms of its machine of origin (represented by the machine nodes 1610) and the machine property quantified by the data value (represented by the property nodes 1612).

Conventionally, the configuration of industrial data analytics requires the participation of data scientists who may have no direct expertise in the relevant industrial domains. This necessitates coordination of efforts between data scientists and domain experts, such as industrial engineers, to develop industrial data collection and analytics applications. This process can consume excessive time and effort, and may compromise the accuracy of the resulting application due to miscommunications or failure on the data scientist's part to fully understand the industrial systems being analyzed. By contrast, the feature engineering tools supported by the gateway device 402 provide a user with a simple, intuitive workflow for defining reduced sets of data that are known to be relevant to a particular KPI of interest. This workflow is enabled by the pre-contextualization and pre-structuring of data by the BIDTs 322 and asset models 422 described above. By presenting a contextualized view of available data, structured in a manner understandable by users who are familiar with the industrial process, the feature engineering workflow described herein allows users with relevant domain expertise to configure their own feature engineering analytics, as well as to easily define how results of these analytics are consumed or used.

Moreover, since the gateway device 402 collects and analyzes a reduced set of BIDT data 1408 known to be relevant to each KPI of interest, the health of the industrial process can be assessed more quickly relative to big data approaches, whereby analysis is applied to a larger set of data that includes data points irrelevant to the health metrics of interest. This allows the gateway device 402, or other analytic systems that consume results 1804 of the analytics, to initiate substantially real-time responses to detected process health concerns, such as rejection of in-process products or initiation of machine shut-downs. This approach can also yield more accurate process health monitoring by focusing analytics only on the data points known to have an impact on the KPI being examined. The gateway device 402 can store and execute multiple user-defined output models 424, allowing multiple metrics of process quality to be assessed in substantially real-time. These models 424 can assess a range of different metrics of the industrial process, including but not limited to product quality, energy consumption, overall equipment effectiveness, or other such metrics.

Also, output models 424 generated using the workflow described above are scalable to other automation systems that carry out similar industrial processes. In this regard, an output model 424 can be copied to or otherwise applied to multiple similar automation systems to facilitate focused data collection and KPI assessment for those systems. Since the output model 424 references BIDTs 322 by their device-level nomenclature, the model 424 can be applied to any industrial system by aligning the BIDT nomenclature to that of the model 424.

Figure 20A:
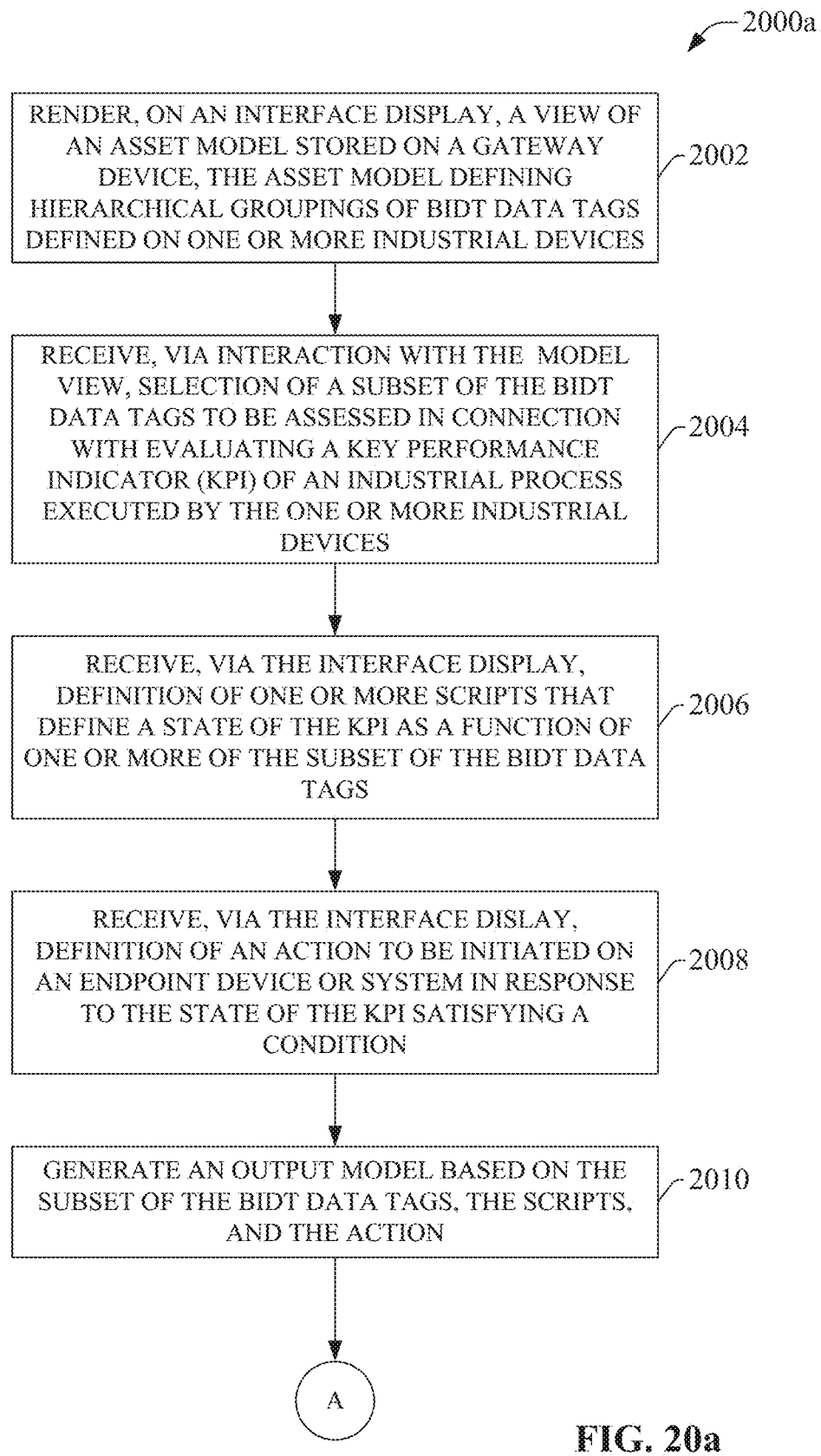
FIG. 20a is a flowchart of a first part of an example methodology for configuring a feature engineering application for an industrial process.
Figure 20B:
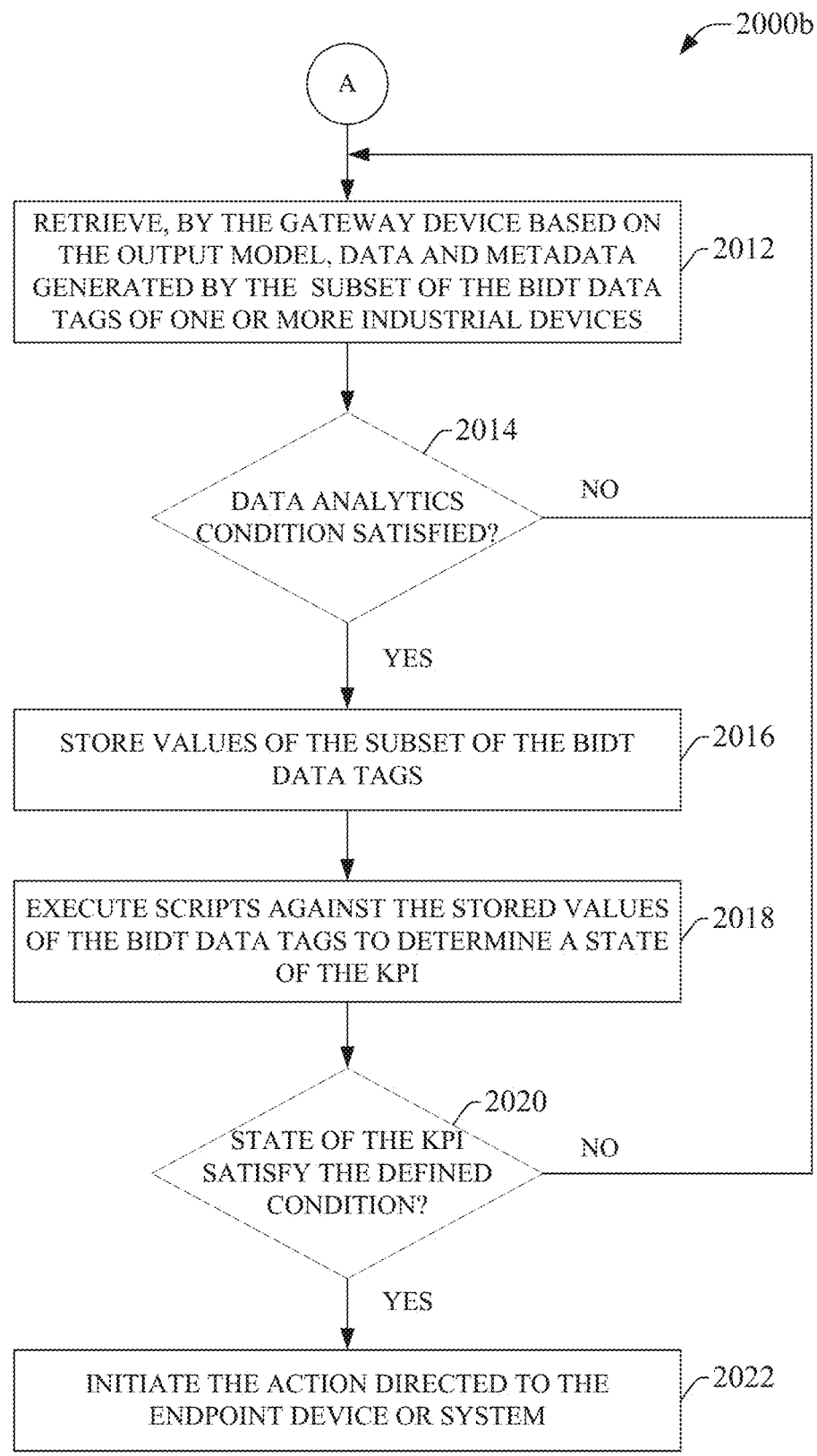
FIG. 20b is a flowchart of a second part of the example methodology for configuring a feature engineering application for an industrial process.

FIGS. 20*a*-20*b* illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 20*a* illustrates a first part of an example methodology 2000*a* for configuring a feature engineering application for an industrial process. Initially, at 2002, a view of an asset model stored on a gateway device is rendered on an interface display delivered to a client device. The asset model defines hierarchical groupings of BIDT data tags defined on one or more industrial devices. The asset model can define a hierarchical arrangement of plant elements—e.g., plant facilities, production areas or lines, industrial assets, industrial equipment or devices that make up an industrial asset, etc.—and map selected BIDT data tags to respective elements of the hierarchy.

At 2004, selection of a subset of the BIDT data tags to be assessed in connection evaluating a key performance indicator (KPI) of an industrial process is received via interaction with the model view rendered at step 2002. In an example embodiment, the interface display can allow the user to select nodes of the model view representing data points (BIDT data tags) known to have an impact on the KPI.

At 2006, definition of one or more scripts is received via the interface display. The scripts can define a state of the KPI as a mathematical function of one or more of the subset of the BIDT data tags selected at step 2004. At 2008, definition of an action to be initiated on an endpoint device or system in response to the state of the KPI satisfying a condition is received via the interface display. The condition may be, for example, a condition indicative of a degradation of the KPI to a degree requiring notification of personnel or a control countermeasure. The action can comprise, for example, delivery of a notification to a specified person, generation of a control instruction directed to an industrial machine or device (e.g., an instruction to reject an in-process product or a batch of products, an instruction to stop the machine, etc.), or other such actions. At 2010, an output model is generated based on the subset of the BIDT data tags selected at step 2004, the scripts defined at step 2006, and the action defined at step 2008.

The methodology then proceeds to the second part 2000*b* illustrated in FIG. 20*b*. At 2012, during operation of the industrial process, data and metadata generated by the subset of the BIDT tags defined by the model are retrieved from the industrial devices. At 2014, a determination is made as to whether a data analytics condition is satisfied. This data analytics condition can, for example, arrival of an Nth unit of interest that passes through the industrial process, where N is an integer. Other data analytics conditions are also within the scope of one or more embodiments. If the data analytics condition is not satisfied (NO at step 2014), the methodology returns to step 2014 and the gateway device continues to retrieve data from the subset of the data tags. Alternatively, if the data analytics condition is satisfied (YES at step 2014), the methodology proceeds to step 2016, where values of the subset of the BIDT data tags are stored for archival storage and analysis.

At 2018, the scripts are executed against the values stored at step 2016 to determine a state of the KPI for which the output model 424 was created. At 2020, a determination is made as to whether the state of the KPI, as determined based on a result of executing the scripts at step 2018, satisfies the conditioned defined at step 2008. If the state of the KPI does not satisfy the condition (NO at step 2020), the methodology returns to step 2012, and steps 2012-2020 are repeated. If the state of the KPI is determined to satisfy the defined condition (YES at step 2020), the methodology proceeds to step 2022, wherein the action defined at step 2008 is initiated and directed to the specified endpoint device or system.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 21:
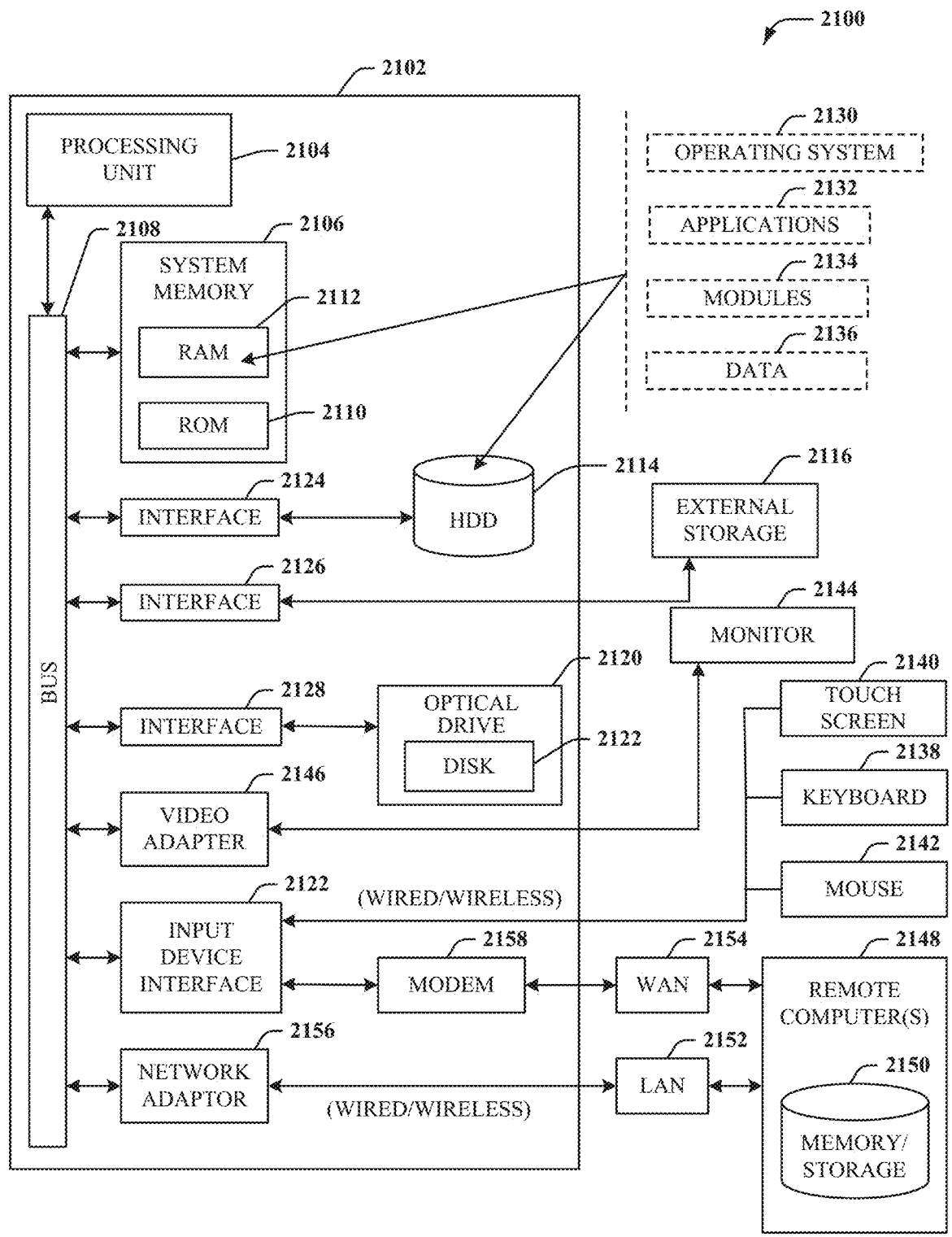
FIG. 21 is an example computing environment.
Figure 22:
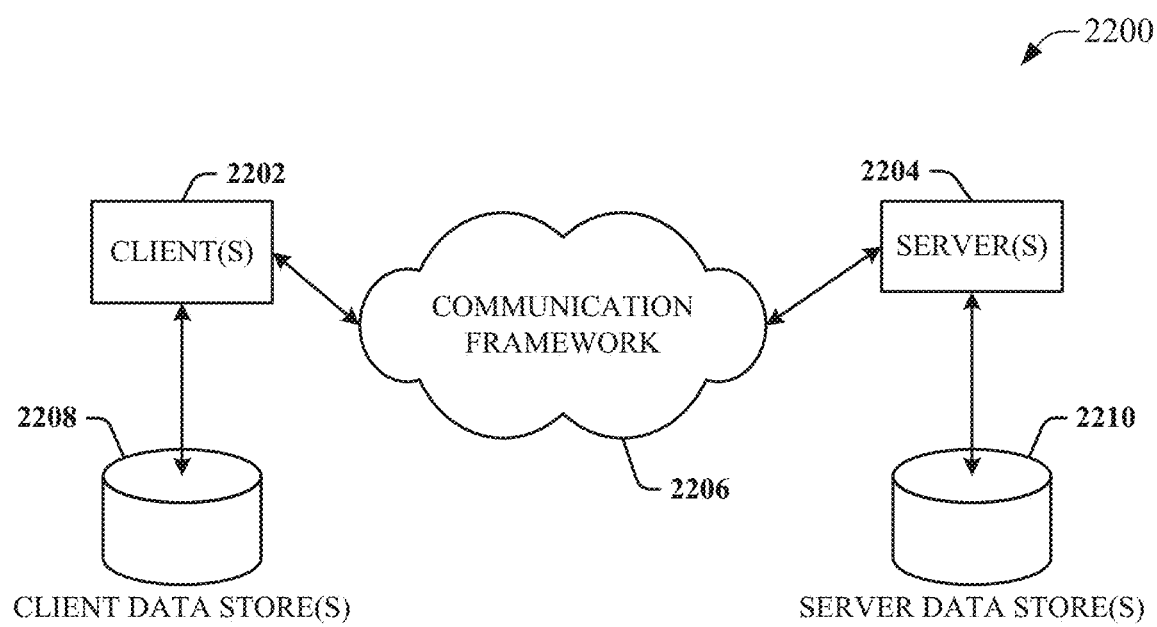
FIG. 22 is an example networking environment.

In order to provide a context for the various aspects of the disclosed subject matter, FIGS. 21 and 22 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), one or more external storage devices 2116 (e.g., a magnetic floppy disk drive (FDD) 2116, a memory stick or flash drive reader, a memory card reader, etc.) and an optical disk drive 2120 (e.g., which can read or write from a CD-ROM disc, a DVD, a BD, etc.). While the internal HDD 2114 is illustrated as located within the computer 2102, the internal HDD 2114 can also be configured for external use in a suitable chassis (not shown). Additionally, while not shown in environment 2100, a solid state drive (SSD) could be used in addition to, or in place of, an HDD 2114. The HDD 2114, external storage device(s) 2116 and optical disk drive 2120 can be connected to the system bus 2108 by an HDD interface 2124, an external storage interface 2126 and an optical drive interface 2128, respectively. The interface 2124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

Computer 2102 can optionally comprise emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can comprise one virtual machine (VM) of multiple VMs hosted at computer 2102. Furthermore, operating system 2130 can provide runtime environments, such as the Java runtime environment or the .NET framework, for application programs 2132. Runtime environments are consistent execution environments that allow application programs 2132 to run on any operating system that includes the runtime environment. Similarly, operating system 2130 can support containers, and application programs 2132 can be in the form of containers, which are lightweight, standalone, executable packages of software that include, e.g., code, runtime, system tools, system libraries and settings for an application.

Further, computer 2102 can be enable with a security module, such as a trusted processing module (TPM). For instance with a TPM, boot components hash next in time boot components, and wait for a match of results to secured values, before loading a next boot component. This process can take place at any layer in the code execution stack of computer 2102, e.g., applied at the application execution level or at the operating system (OS) kernel level, thereby enabling security at any level of code execution.

A user can enter commands and information into the computer 2102 through one or more wired/wireless input devices, e.g., a keyboard 2138, a touch screen 2140, and a pointing device, such as a mouse 2142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 1394 serial port, a game port, a USB port, an IR interface, a BLUETOOTH® interface, etc.

A monitor 2144 or other type of display device can be also connected to the system bus 2108 via an interface, such as a video adapter 2146. In addition to the monitor 2144, a computer typically includes other peripheral output devices (not shown), such as speakers, printers, etc.

The computer 2102 can operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2152 through a wired and/or wireless communication network interface or adapter 2156. The adapter 2156 can facilitate wired or wireless communication to the LAN 2152, which can also include a wireless access point (AP) disposed thereon for communicating with the adapter 2156 in a wireless mode.

When used in a WAN networking environment, the computer 2102 can include a modem 2158 or can be connected to a communications server on the WAN 2154 via other means for establishing communications over the WAN 2154, such as by way of the Internet. The modem 2158, which can be internal or external and a wired or wireless device, can be connected to the system bus 2108 via the input device interface 2122. In a networked environment, program modules depicted relative to the computer 2102 or portions thereof, can be stored in the remote memory/storage device 2150. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above. Generally, a connection between the computer 2102 and a cloud storage system can be established over a LAN 2152 or WAN 2154 e.g., by the adapter 2156 or modem 2158, respectively. Upon connecting the computer 2102 to an associated cloud storage system, the external storage interface 2126 can, with the aid of the adapter 2156 and/or modem 2158, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 22 is a schematic block diagram of a sample computing environment 2200 with which the disclosed subject matter can interact. The sample computing environment 2200 includes one or more client(s) 2202. The client(s) 2202 can be hardware and/or software (e.g., threads, processes, computing devices). The sample computing environment 2200 also includes one or more server(s) 2204. The server(s) 2204 can also be hardware and/or software (e.g., threads, processes, computing devices). The servers 2204 can house threads to perform transformations by employing one or more embodiments as described herein, for example. One possible communication between a client 2202 and servers 2204 can be in the form of a data packet adapted to be transmitted between two or more computer processes. The sample computing environment 2200 includes a communication framework 2206 that can be employed to facilitate communications between the client(s) 2202 and the server(s) 2204. The client(s) 2202 are operably connected to one or more client data store(s) 2208 that can be employed to store information local to the client(s) 2202. Similarly, the server(s) 2204 are operably connected to one or more server data store(s) 2210 that can be employed to store information local to the servers 2204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a user interface component configured to
render, on a client device via an interface display, an interactive model view of an asset model that models an industrial process in terms of hierarchical elements, wherein the interactive model view represents the hierarchical elements as a hierarchical arrangement of nodes corresponding to data tags defined on one or more industrial devices that implement the industrial process, and
receive, via interaction with the interactive model view, selection of a subset of the nodes and scripting input that defines an executable script, the executable script defining a mathematical relationship between the subset of the nodes and a state of a performance indicator of the industrial process; and
a model generation component configured to generate, based on the selection and the scripting input, an output model that defines a subset of the data tags corresponding to the subset of the nodes and the executable script,
wherein the output model configures the system to retrieve, from the one or more industrial devices, data associated with the subset of the data tags.

2. The system of claim 1, wherein the output model configures the system to execute the executable script on the data associated with the subset of the data tags for respective units processed by the industrial process.

3. The system of claim 2, wherein
execution of the executable script on the industrial data yields a result indicative of a health of the performance indicator, and
the user interface component is further configured to receive, via interaction with the interface display, definition of an action to be performed in response to a determination that the result satisfies a criterion indicative of a degraded health of the performance indicator.

4. The system of claim 2, wherein
the user interface component is further configured to receive, via interaction with interface display, a definition of a trigger event that is to trigger execution of the executable script on the data, and
the model generation component is configured to encode the trigger event as part of the output model.

5. The system of claim 1, wherein
the asset model comprises multiple hierarchical levels, and
the hierarchical elements of the asset model represent at least one of a plant facility, a production area, a production line, a production cell, a production station, a machine, an industrial asset, a unit of equipment, or an industrial device.

6. The system of claim 1, wherein the output model further configures the system to store a set of values of the data associated with the subset of the data tags in association with respective units processed by the industrial process.

7. The system of claim 1, wherein the data tags respectively conform to one of a set of basic information data types, the set of basic information data types comprising at least a state data type, a rate data type, an odometer data type, and an event data type.

8. The system of claim 7, wherein
the state data type represents a set of available states associated with an industrial asset of the industrial process,
the rate data type represents a rate associated with an industrial asset of the industrial process,
the odometer data type represents a cumulative quantity associated with an industrial asset of the industrial process, and
the event data type represents an instantaneous event or a persistent event associated with an industrial asset of the industrial process.

9. A method, comprising:
rendering, by the system on a client device, an interface display that renders an interactive model view of an asset model that models an industrial process in terms of hierarchical elements, wherein the interactive model view represents the hierarchical elements as a hierarchical arrangement of nodes corresponding to data tags defined on one or more industrial devices that implement the industrial process;
receiving, by the system via interaction with the interactive model view, selection of a subset of the nodes and scripting input that defines an executable script, wherein the executable script defines a mathematical relationship between the subset of the nodes and a state of a performance indicator of the industrial process;
generating, by the system based on the selection and the scripting input, an output model that defines a subset of the data tags corresponding to the subset of the nodes and the executable script; and
for respective units generated by the industrial process, retrieving, by the system from the one or more industrial devices based on the output model, data associated with the subset of the data tags.

10. The method of claim 9, further comprising, for the respective units generated by the industrial process, executing the executable script on the data based on the output model.

11. The method of claim 10, wherein
the executing of the executable script on the data yields a result indicative of a health of the performance indicator, and
the method further comprises receiving, by the system via interaction with the interface display, definition of an action to be performed in response to a determination that the result satisfies a criterion indicative of a degraded health of the performance indicator.

12. The method of claim 9, further comprising:
receiving, by the system via interaction with interface display, a definition of a trigger event that is to trigger execution of the executable script on the data, and
encoding, by the system, the trigger event as part of the output model.

13. The method of claim 9, further comprising, storing, by the system based on the output model, sets of values of the subset of the data tags in association with respective instances of the performance indicator.

14. The method of claim 9, wherein
the asset model comprises multiple hierarchical levels, and
the hierarchical elements of the asset model represent at least one of a plant facility, a production area, a production line, a production cell, a production station, a machine, an industrial asset, a unit of equipment, or an industrial device.

15. The method of claim 9, wherein the data tags respectively conform to one of a set of basic information data types, the set of basic information data types comprising at least a state data type, a rate data type, an odometer data type, and an event data type.

16. A non-transitory computer-readable medium having stored thereon instructions that, in response to execution, cause a system comprising a processor to perform operations, the operations comprising:
rendering, on a client device, an interactive model view of an asset model that models an industrial process in terms of hierarchical elements, wherein the interactive model view represents the hierarchical elements as a hierarchical arrangement of nodes corresponding to data tags defined on one or more industrial devices that implement the industrial process;
receiving, via interaction with the interactive model view, selection of a subset of the nodes and scripting input that defines an executable script, wherein the executable script defines a mathematical relationship between the subset of the nodes and a state of a performance indicator of the industrial process;
generating, based on the selection and the scripting input, an output model that defines a subset of the data tags corresponding to the subset of the nodes and the executable script; and
for respective units generated by the industrial process, retrieving, by the system from the one or more industrial devices based on the output model, data associated with the subset of the data tags.

17. The non-transitory computer-readable medium of claim 16, wherein the operations further comprise, for the respective units generated by the industrial process, executing the executable script on the data based on the output model.

18. The non-transitory computer-readable medium of claim 17, wherein
- the executing of the executable script on the data yields a result indicative of a health of the performance indicator, and
- the operations further comprise receiving, via interaction with the interactive model view, definition of an action to be performed in response to a determination that the result satisfies a criterion indicative of a degraded health of the performance indicator.

19. The non-transitory computer-readable medium of claim 16, wherein the operations further comprise:
- receiving, via interaction with interactive model view, a definition of a trigger event that is to trigger execution of the executable script on the data, and
- encoding the trigger event as part of the output model.

20. The non-transitory computer-readable medium of claim 16, wherein the operations further comprise storing, based on the output model, sets of values of the subset of the data tags in association with respective instances of the performance indicator.

* * * * *